US010408091B2

(12) United States Patent
Kolvick et al.

(10) Patent No.: US 10,408,091 B2
(45) Date of Patent: Sep. 10, 2019

(54) MOUNTING APPARATUSES SECURED TO TURBINE AIRFOILS OF TURBINE SYSTEMS

(71) Applicant: General Electric Company, Schenectady, NY (US)

(72) Inventors: Sandra Beverly Kolvick, Simpsonville, SC (US); Daryl Paul Capriotti, Simpsonville, SC (US); Ansley Michelle Heard, Greenville, SC (US); Rachel Kate King, Greenville, SC (US); Travis Edwin Lipstein, Greenville, SC (US); Maithri Muddasani, Houston, TX (US); Tewodros Fiseha Wondimu, Greenville, SC (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 15/476,224

(22) Filed: Mar. 31, 2017

(65) Prior Publication Data

US 2018/0283214 A1 Oct. 4, 2018

(51) Int. Cl.
*G01B 5/25* (2006.01)
*F01D 25/28* (2006.01)
(Continued)

(52) U.S. Cl.
CPC .............. *F01D 25/28* (2013.01); *B25B 5/065* (2013.01); *B25B 5/14* (2013.01); *F01D 5/147* (2013.01);
(Continued)

(58) Field of Classification Search
CPC ............ B25B 5/065; B25B 5/14; F01D 5/147
(Continued)

(56) References Cited

U.S. PATENT DOCUMENTS

| | | | |
|---|---|---|---|
| 2,128,268 A | 8/1938 | Small et al. | |
| 4,395,827 A * | 8/1983 | Stowe | F01D 11/08 33/613 |

(Continued)

FOREIGN PATENT DOCUMENTS

| | | |
|---|---|---|
| EP | 0 013 772 A1 | 8/1980 |
| EP | 2 832 501 A2 | 2/2015 |
| GB | 2 421 454 A | 6/2006 |

OTHER PUBLICATIONS

Extended European Search Report and Opinion issued in connection with corresponding EP Application No. 18162902.3 dated Aug. 29, 2018.

*Primary Examiner* — George B Bennett
(74) *Attorney, Agent, or Firm* — Juergen Hoffmann; Hoffman Warnick LLC

(57) ABSTRACT

Mounting apparatuses for turbine airfoils of turbine systems are disclosed. The mounting apparatuses may include a body portion configured to be at least partially positioned between a first airfoil and a second airfoil of the turbine system, and an adjustable, first retention component formed on a first side of the body portion. The adjustable, first retention component may be configured to contact a portion of a suction side of the first airfoil of the turbine system. The mounting apparatuses may also include a second retention component formed on a second side of the body portion, opposite the first side. The second retention component may be configured to contact a portion of a pressure side of the second airfoil of the turbine system.

20 Claims, 29 Drawing Sheets

(51) Int. Cl.

| | |
|---|---|
| ***B25B 5/06*** | (2006.01) |
| ***B25B 5/14*** | (2006.01) |
| ***F01D 5/14*** | (2006.01) |

(52) U.S. Cl.
CPC ...... *F05D 2220/32* (2013.01); *F05D 2240/90* (2013.01); *F05D 2260/30* (2013.01)

(58) Field of Classification Search
USPC ............................................................ 33/613
See application file for complete search history.

(56) References Cited

U.S. PATENT DOCUMENTS

| | | | | |
|---|---|---|---|---|
| 4,611,408 | A * | 9/1986 | Plante .................... | G01B 5/285 33/552 |
| 7,081,606 | B2 | 7/2006 | Osaragi et al. | |
| 7,579,844 | B2 | 8/2009 | Ducheminsky et al. | |
| 8,023,269 | B2 | 9/2011 | Mitchell et al. | |
| 8,092,080 | B2 | 1/2012 | Mitchell et al. | |
| 8,220,990 | B2 | 7/2012 | Mitchell et al. | |
| 8,223,036 | B2 | 7/2012 | Mitchell et al. | |
| 8,400,501 | B2 | 3/2013 | Heyworth et al. | |
| 8,519,866 | B2 | 8/2013 | Mitchell et al. | |
| 8,525,036 | B2 | 9/2013 | Mitchell et al. | |
| 8,527,241 | B2 | 9/2013 | Mitchell et al. | |
| 8,599,082 | B2 | 12/2013 | Mitchell et al. | |
| 8,629,783 | B2 | 1/2014 | Mitchell et al. | |
| 8,797,179 | B2 | 8/2014 | Subramanian et al. | |
| 9,071,888 | B2 | 6/2015 | Subramanian et al. | |
| 9,325,388 | B2 | 4/2016 | Bevly, III | |
| 9,587,926 | B2 * | 3/2017 | Hyslop .................... | G01B 5/14 |
| 2008/0218181 | A1 | 9/2008 | Ducheminsky et al. | |
| 2009/0030648 | A1 * | 1/2009 | Hunter .................. | G01B 21/04 702/152 |
| 2009/0078053 | A1 | 3/2009 | Twerdochlib | |
| 2010/0064537 | A1 * | 3/2010 | Petroskie ............... | G01B 5/205 33/533 |
| 2014/0265580 | A1 | 9/2014 | Cooley et al. | |
| 2014/0289299 | A1 | 9/2014 | Valente | |
| 2015/0075265 | A1 * | 3/2015 | Memmer ................ | F01D 11/14 73/112.01 |
| 2015/0174837 | A1 | 6/2015 | Kolvick et al. | |
| 2016/0123732 | A1 * | 5/2016 | Marocchini ............ | G01B 21/22 33/1 PT |
| 2016/0201486 | A1 * | 7/2016 | Hartung .................. | F01D 9/041 415/211.2 |

* cited by examiner

MOUNTING APPARATUSES SECURED TO TURBINE AIRFOILS OF TURBINE SYSTEMS

BACKGROUND OF THE INVENTION

The disclosure relates generally to mounting apparatuses, and more particularly, to mounting apparatuses for turbine airfoils of turbine systems.

Conventional turbo machines, such as gas turbine systems, are utilized to generate power for electric generators. In general, gas turbine systems generate power by passing a fluid (e.g., hot gas) through a compressor and a turbine component of the gas turbine system. More specifically, inlet air may be drawn into a compressor and may be compressed. Once compressed, the inlet air is mixed with fuel to form a combustion product, which may be ignited by a combustor of the gas turbine system to form the operational fluid (e.g., hot gas) of the gas turbine system. The fluid may then flow through a fluid flow path for rotating a plurality of rotating blades and rotor or shaft of the turbine component for generating the power. The fluid may be directed through the turbine component via the plurality of rotating blades and a plurality of stationary nozzles or vanes positioned between the rotating blades. As the plurality of rotating blades rotate the rotor of the gas turbine system, a generator, coupled to the rotor, may generate power from the rotation of the rotor.

In order to ensure each component of conventional gas turbine systems is operating at a desired level of efficiency and/or are generating a desired amount of power, the system and its components are often inspected and/or undergo inspection processes. In one example, it is crucial to operations of the conventional gas turbine systems that certain components remain aligned and/or maintain predetermined clearances. Specifically in an example, it is crucial that turbine blades rotating within the turbine component maintain a predetermined clearance with the shell or casing surrounding the turbine blades. Conventional inspection processes utilize an inspection device that may be coupled to turbine blade(s) of the turbine component via a coupling component. Once the inspection device is coupled to the turbine blade(s) using the coupling component, the turbine blades are rotated, along with the inspection device, to measure the clearance between the turbine blades and the shell. However, these coupling components are often large and/or cumbersome, which makes it difficult or impossible to manipulate the coupling components through the turbine component; especially where a space for inserting or accessing the turbine blades is limited. Additionally, because of the size and the configuration, conventional coupling components cannot adequately couple the inspection device to the turbine blade(s) during the inspection process. As such, the position of the inspection device may change (e.g., slippage of the coupling components) during the inspection process, which results in inaccurate measurements of the clearance between the turbine blades and the shell or casing of the turbine component. This ultimately affects the ability of the operator of the gas turbine systems from correcting operational inefficiencies and/or decreases in power generation caused by misalignment and/or undesirable clearances between the turbine blades and the shell of the turbine component.

BRIEF DESCRIPTION OF THE INVENTION

A first aspect of the disclosure provides a mounting apparatus including: a body portion configured to be at least partially positioned between a first airfoil and a second airfoil of a turbine system; an adjustable, first retention component formed on a first side of the body portion, the adjustable, first retention component configured to contact a portion of a suction side of the first airfoil of the turbine system; and a second retention component formed on a second side of the body portion, opposite the first side, the second retention component configured to contact a portion of a pressure side of the second airfoil of the turbine system.

A second aspect of the disclosure provides a turbine system including: a first airfoil including a pressure side and a suction side; a second airfoil positioned adjacent the first airfoil, the second airfoil including a pressure side and a suction side; and a mounting apparatus releasably coupled to the first airfoil and the second airfoil, the mounting apparatus including: a body portion configured to be at least partially positioned between the first airfoil and the second airfoil; an adjustable, first retention component formed on a first side of the body portion, the adjustable, first retention component configured to contact a portion of the suction side of the first airfoil; and a second retention component formed on a second side of the body portion, opposite the first side, the second retention component configured to contact a portion of the pressure side of the second airfoil.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
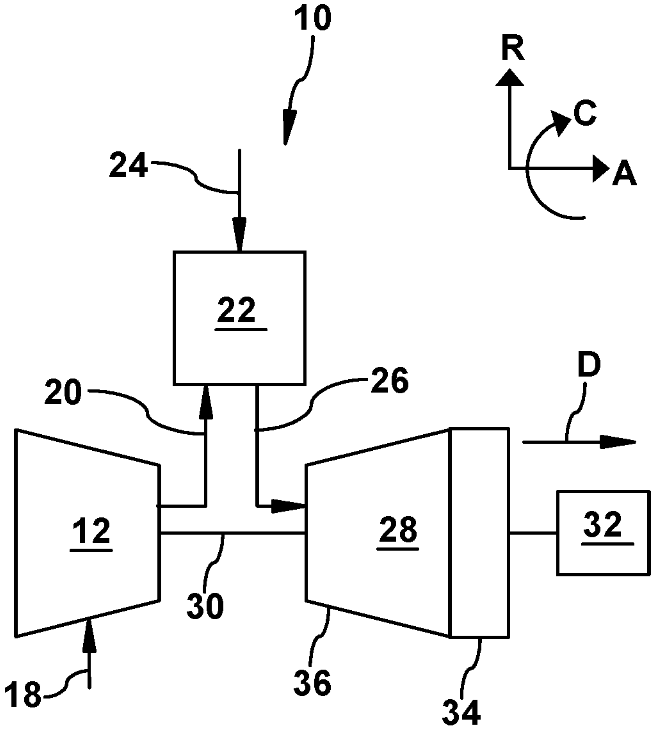
FIG. 1 shows a schematic diagram of a gas turbine system, according to embodiments.

As an initial matter, in order to clearly describe the current disclosure it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along an axis "R" (see, FIG. 1), which is substantially perpendicular with axis A and intersects axis A at only one location. Finally, the term "circumferential" refers to movement or position around axis A (e.g., axis "C").

The following disclosure relates generally to mounting apparatuses, and more particularly, to mounting apparatuses for turbine airfoils of turbine systems.

These and other embodiments are discussed below with reference to FIGS. 1-29. However, those skilled in the art will readily appreciate that the detailed description given herein with respect to these Figures is for explanatory purposes only and should not be construed as limiting.

FIG. 1 shows a schematic view of an illustrative gas turbine system 10. Gas turbine system 10 may include a compressor 12. Compressor 12 compresses an incoming flow of air 18. Compressor 12 delivers a flow of compressed air 20 to a combustor 22. Combustor 22 mixes the flow of compressed air 20 with a pressurized flow of fuel 24 and ignites the mixture to create a flow of combustion gases 26. Although only a single combustor 22 is shown, gas turbine system 10 may include any number of combustors 22. The flow of combustion gases 26 is in turn delivered to a turbine 28, which typically includes a plurality of turbine blades including airfoils (see, FIG. 2) and stator vanes. The flow of combustion gases 26 drives turbine 28 to produce mechanical work. The mechanical work produced in turbine 28 drives compressor 12 via a rotor 30 extending through turbine 28, and may be used to drive an external load 32, such as an electrical generator and/or the like.

Gas turbine system 10 may also include an exhaust frame 34. As shown in FIG. 1, exhaust frame 34 may be positioned adjacent to turbine 28 of gas turbine system 10. More specifically, exhaust frame 34 may be positioned adjacent to turbine 28 and may be positioned substantially downstream of turbine 28 and/or the flow of combustion gases 26 flowing from combustor 22 to turbine 28. As discussed herein, a portion (e.g., outer casing) of exhaust frame 34 may be coupled directly to an enclosure or shell 36 of turbine 28.

Subsequent to combustion gases 26 flowing through and driving turbine 28, combustion gases 26 may be exhausted, flow-through and/or discharged through exhaust frame 34 in a flow direction (D). In the non-limiting example shown in FIG. 1, combustion gases 26 may flow through exhaust frame 34 in the flow direction (D) and may be discharged from gas turbine system 10 (e.g., to the atmosphere). In another non-limiting example where gas turbine system 10 is part of a combined cycle power plant (e.g., including gas turbine system and a steam turbine system), combustion gases 26 may discharge from exhaust frame 34, and may flow in the flow direction (D) into a heat recovery steam generator of the combined cycle power plant.

Figure 2:
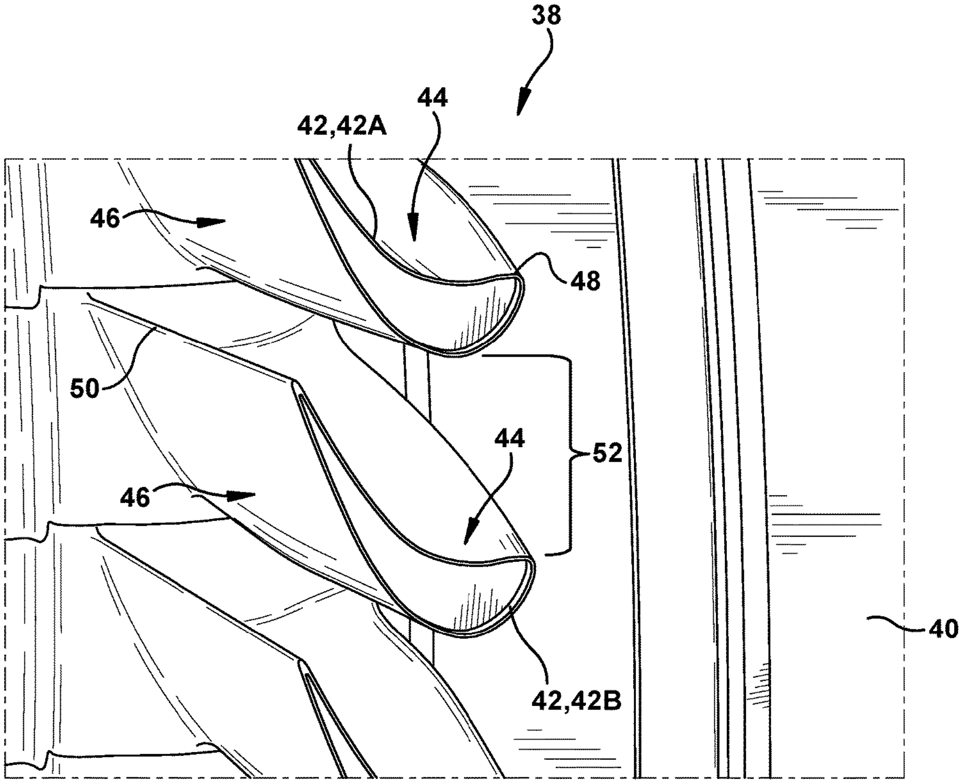
FIG. 2 shows a perspective view of a portion of a turbine of the gas turbine system including turbine blades, stator vanes and rotor, according to embodiments.

Turning to FIG. 2, and with continued reference to FIG. 1, a portion of gas turbine system 10 is shown. Specifically, FIG. 2 shows a portion of gas turbine system 10 including a first stage of turbine blades 38, and a first stage of stator vanes 40 coupled to shell 36 of turbine 28. As discussed herein rotor 30 may include a plurality of turbine blades 38 that may be coupled to and positioned circumferentially around rotor 30 and may be driven by combustion gases 26 to rotate rotor 30. Each turbine blade 38 of turbine 28 may include an airfoil 42 extending radially from rotor 30 and positioned within the flow path of combustion gases 26 flowing through turbine 28. Airfoils 42 may also be positioned axially adjacent to stator vanes 40 of turbine 28. In the non-limiting example shown in FIG. 2, not all turbine blades 38 of the first stage, stator vanes 40 and/or all of rotor 30 of turbine 28 are shown for clarity. Additionally, although only a portion of the first stage of turbine blades 38 and stator vanes 40 of turbine 28 are shown in FIG. 2, turbine 28 may include a plurality of stages of turbine blades and stator vanes, positioned axially through shell 36 of turbine 28.

Each airfoil 42 of turbine blades 38 may include a pressure side 44 and a suction side 46, respectively. Specifically, first airfoil 42A and second airfoil 42B may each include pressure side 44 and suction side 46 positioned opposite pressure side 44. Additionally, each airfoil 42 may include a leading edge 48 and a trailing edge 50 positioned between pressure side 44 and suction side 46. That is, leading edge 48 and trailing edge 50, positioned opposite leading edge 48, may separate, be positioned between and/or define pressure side 44 and suction side 46 for each airfoil 42 of turbine 28. As shown in FIG. 2, suction side 46 of first airfoil 42A may be positioned circumferentially adjacent pressure side 44 of second airfoil 42B. A gap or space 52 (hereafter, "space 52") may also be formed between first airfoil 42A and second airfoil 42B, and more specifically, suction side 46 of first airfoil 42A and pressure side 44 of second airfoil 42B. In some non-limiting examples discussed herein, a mounting apparatus may be positioned within space 52 and/or between first airfoil 42A and second airfoil 42B of turbine 28 (see, FIG. 1).

Figure 3:
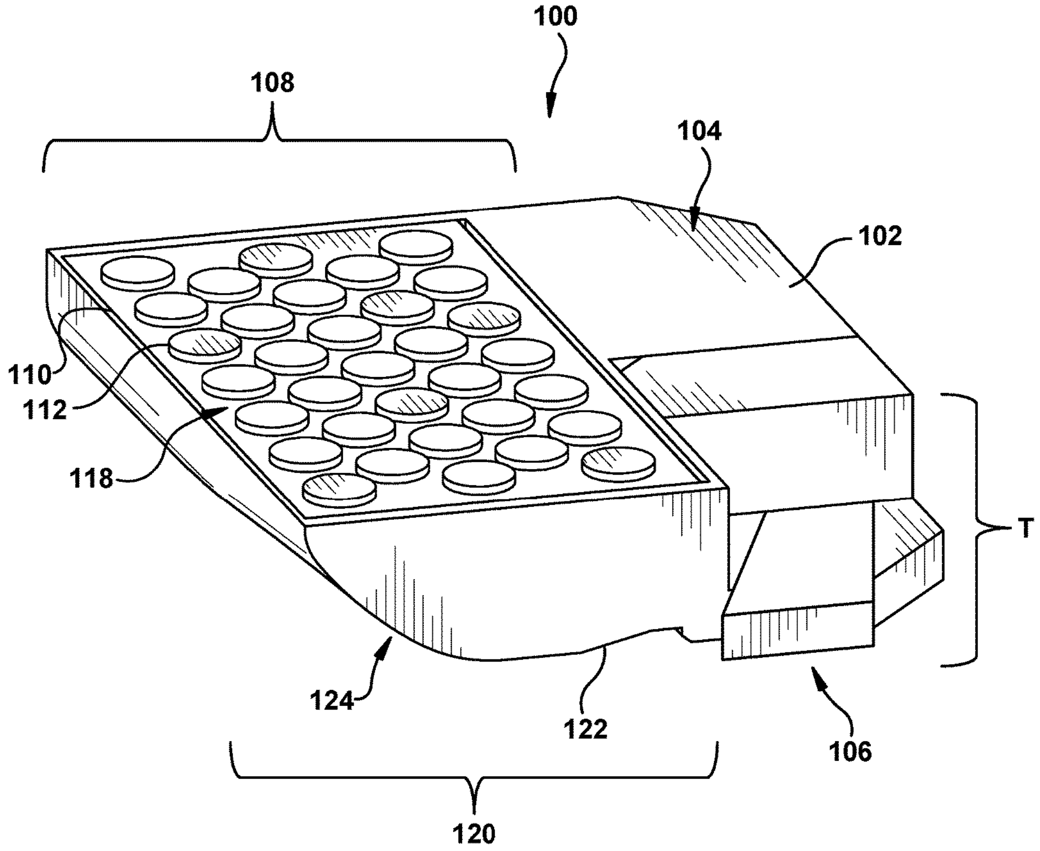
FIG. 3 shows a perspective view of a mounting apparatus including an inflatable pouch in a deflated state, according to embodiments.
Figure 4:
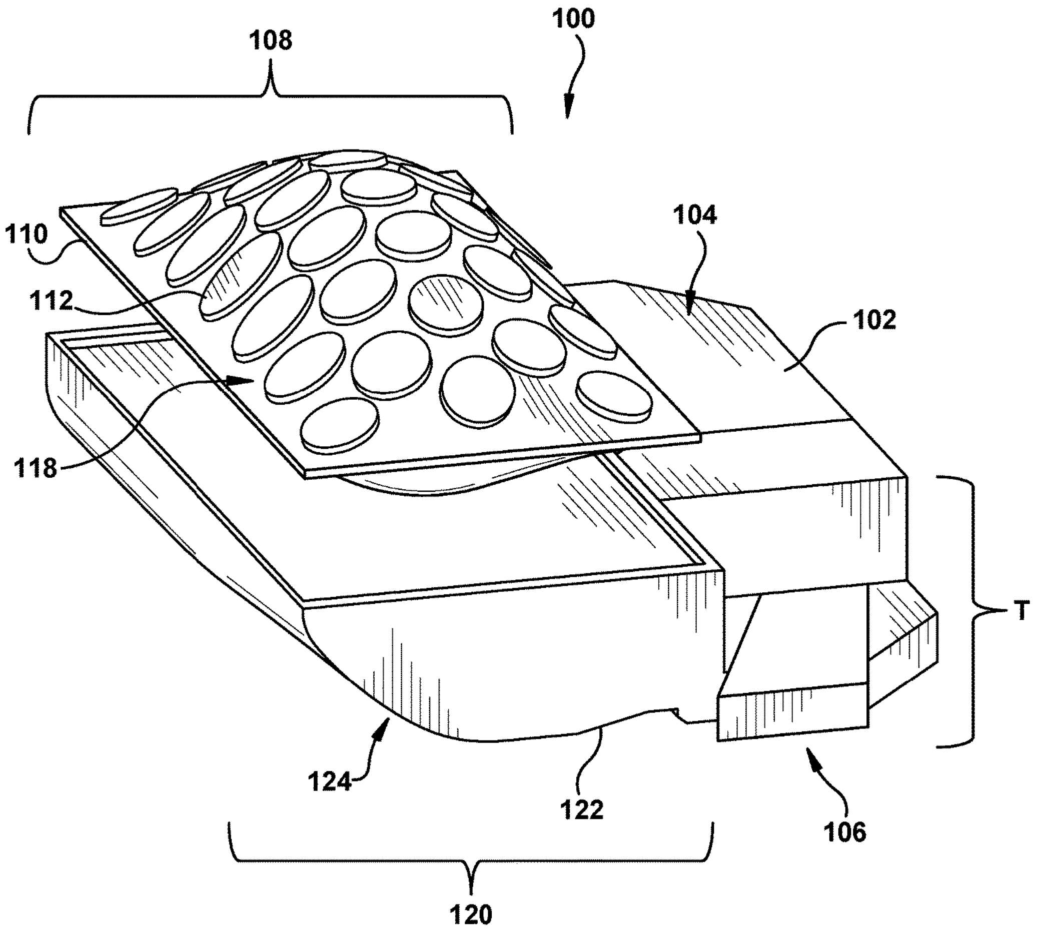
FIG. 4 shows a perspective view of the mounting apparatus of FIG. 3 in an inflated state, according to embodiments.

FIGS. 3 and 4 show perspective views of a mounting apparatus 100 configured to be coupled with airfoils 42 of turbine 28. Mounting apparatus 100 includes a body portion 102. Body portion 102 may be a substantially rigid structure or portion of mounting apparatus 100 that may support mounting apparatus 100 and/or its various features or components, discussed herein. As shown in FIGS. 3 and 4, body portion 102 may include a first side 104 and a second side 106 positioned opposite first side 104. Body portion 102 of mounting apparatus 100 may be formed from any suitable material that may be capable of supporting the various features of mounting apparatus 100 and/or aiding in the coupling of mounting apparatus 100 to airfoils 42 of turbine 28. For example, body portion 102 may be formed from any material(s) including, but not limited to, metal, metal-alloys, plastics, ceramic, wood and the like. As discussed herein, body portion 102 may be sized such that body portion 102 and/or mounting apparatus 100 may be at least partially positioned between first airfoil 42A and second airfoil 42B when mounting apparatus 100 is releasably coupled to first airfoil 42A and second airfoil 42B.

Mounting apparatus 100 may include an adjustable, first retention component 108 formed on first side 104 of body portion 102. Specifically, mounting apparatus 100 may include configurable, adaptable and/or adjustable, first retention component 108 that may be formed on, positioned on and/or extend from first side 104 of body portion 102. As discussed herein, adjustable, first retention component 108 may be configured as and/or include various features or components that may be configured to contact at least a portion of suction side 46 of first airfoil 42A when releasably coupling mounting apparatus 100 to airfoils 42 of turbine 28 (see, FIGS. 2 and 5).

In a non-limiting example shown in FIGS. 3 and 4, adjustable, first retention component 108 may include a first inflatable bellow or pouch 110 (hereafter, "first inflatable pouch 110"). First inflatable pouch 110 may be positioned and/or formed on first side 104 of body portion 102. First inflatable pouch 110 may be configured to inflate and deflate to aid in the releasable coupling of mounting apparatus 100 to airfoils 42 of turbine 28, as discussed herein. Specifically, FIG. 3 shows first inflatable pouch 110 in a deflated state, and FIG. 4 shows first inflatable pouch 110 in an inflated state. As shown in FIG. 3, when first inflatable pouch 110 is in a deflated state, first inflatable pouch 110 may contact and/or be oriented substantially planar with first side 104 of body portion 102. That is, first inflatable pouch 110 may not extend substantially above first side 104 of body portion 102 in a deflated state, and the thickness (T) of mounting apparatus 100 may be substantially equal to the thickness of body portion 102. In an inflated state, as shown in FIG. 4, first inflatable pouch 110 may inflate, grow and/or extend from first side 104 of body portion 102. In the inflated state, the thickness (T) of mounting apparatus 100 may be the combined thickness of body portion 102, and the height in which first inflatable pouch 110 inflates and/or extends above first side 104 of body portion 102. As discussed herein, first inflatable pouch 110 may contact and substantially contour to a portion of suction side 46 of airfoil 42A in the inflated state to releasably couple mounting apparatus 100 to airfoils 42. First inflatable pouch 110 may be formed from any suitable material, configured as and/or may include any suitable component(s) that may be configured to inflate, grow and/or extend from first side 104 of body portion 102 in an inflated state. In a non-limiting example, first inflatable pouch 110 may function similar to a balloon and may be formed from a substantially elastic material that may inflate and/or grow in the inflated state of first inflatable pouch 110, and may deflate, retract and/or shrink in the deflated state.

As shown in FIGS. 3 and 4, mounting apparatus 100 may also include at least one gripping pad 112. Gripping pad(s) 112 may be positioned on first inflatable pouch 110. Specifically, gripping pad(s) 112 may be positioned on a contact or exposed surface 118 (hereafter, "exposed surface 118") of first inflatable pouch 110 that may be displaced and/or extend away from first side 104 of body portion 102 in the inflated state of first inflatable pouch 110. Although a plurality of gripping pads 112 are shown, it is understood that first inflatable pouch 110 may include a single gripping pad 112 positioned on exposed surface 118. As discussed herein, in the inflated state of first inflatable pouch 110, gripping pad(s) 112 may directly contact suction side 46 of first airfoil 42A to aid in the releasable coupling between mounting apparatus 100 and airfoils 42. Gripping pad(s) 112 may be formed from and/or coated with any suitable material that may provide additional grip and/or friction against contacted airfoil 42A in the inflated state of first inflatable pouch 110. Additionally, or alternatively, gripping pad(s) 112 may be formed from any suitable material that may be substantially flexible to deform and/or contour around contacted airfoil 42A. In non-limiting examples, gripping pad(s) 112 may be formed from and/or coated with polymer material(s), such as rubber or plastic, foam, and the like. Alternatively, and in other non-limiting examples discussed herein, gripping pad(s) 112 may be formed from substantially rigid material (see, FIG. 6).

Mounting apparatus 100 may also include a second retention component 120. Second retention component 120 may be formed on second side 106 of body portion 102, opposite first side 104 and/or adjustable, first retention component 108. Specifically, mounting apparatus 100 may include second retention component 120 that may be formed on, positioned on and/or extend from second side 106 of body portion 102. As discussed herein, second retention component 108 may be configured as and/or include various features or components that may be configured to contact at least a portion of pressure side 44 of second airfoil 42B when releasably coupling mounting apparatus 100 to airfoil 42 of turbine 28 (see, FIGS. 2 and 5).

In a non-limiting example shown in FIGS. 3 and 4, second retention component 120 may include a curved portion 122. In the non-limiting example, curved portion 122 may be formed integral with body portion 102 and/or second side 106 of body portion 102. In another non-limiting example, curved portion 122 may be formed as a distinct component coupled to and/or affixed to second side 106 of body portion 102. As discussed herein, curved portion 122 may be configured to contact a portion of pressure side 44 of second airfoil 42B in the inflated state and deflated state of first inflatable pouch 110 to releasably couple mounting apparatus 100 to airfoils 42. Curved portion 122 forming second retention component 120 may be formed from any suitable material, configured as and/or may include any suitable component(s) that may be configured to contact and/or be seated within pressure side 44 of second airfoil 42B. For example, curved portion 122 may be formed from a substantially rigid material including, but not limited to, metal, metal-alloys, ceramic, polymer material (e.g., rubber, plastic), foam, wood and the like. Additionally, and as discussed herein, curved portion 122 may include a surface 124 including a geometry and/or shape that may be substantially similar and/or correspond to the portion of pressure side 44 of second airfoil 42B.

Figure 5:
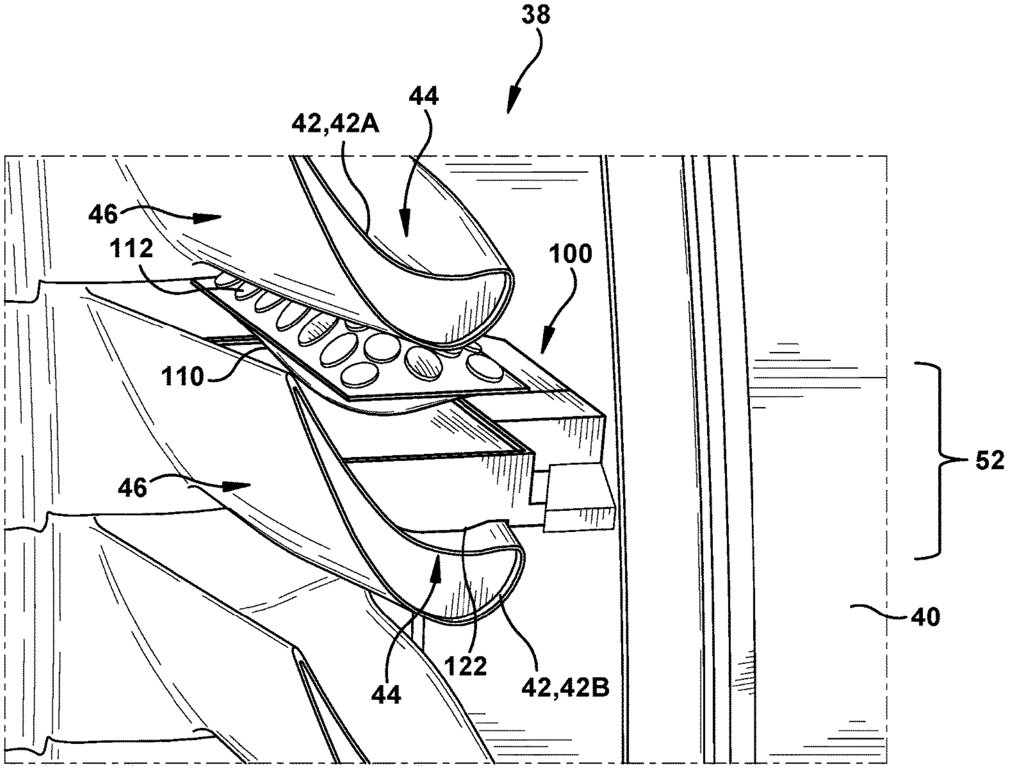
FIG. 5 shows a perspective view of the mounting apparatus of FIG. 3 releasably coupled to airfoils of a turbine of a gas turbine system, according to embodiments.

Turning to FIG. 5, mounting apparatus 100 of FIGS. 3 and 4 is depicted as being releasably coupled to airfoils 42 of turbine 28 of gas turbine system 10 (see, FIG. 1). That is, mounting apparatus 100 may be positioned within space 52 formed between first airfoil 42A and second airfoil 42B, and may be releasably coupled to first airfoil 42A and second airfoil 42B, respectively. As shown in FIG. 5, adjustable, first retention component 108 may contact suction side 46 of first airfoil 42A. In the non-limiting example where adjustable, first retention component 108 is formed as first inflatable pouch 110, first inflatable pouch 110 may contact and substantially counter to the portion of suction side 46 of first airfoil 42A in the inflated state to aid in releasably coupling mounting apparatus 100 to airfoils 42. That is, mounting apparatus 100 may be inserted and/or positioned between first airfoil 42A and second airfoil 42B while first inflatable pouch 110 is in a deflated state (see, FIG. 3). Once positioned between first airfoil 42A and second airfoil 42B, first inflatable pouch 110 may be inflated to allow exposed surface 118 to contact and substantially contour to the shape and/or profile of a portion of suction side 46 of first airfoil 42A. Additionally as shown in FIG. 5, and where first inflatable pouch 110 includes gripping pad(s) 112, gripping pad(s) 112 may directly contact and/or substantially contour to the shape and/or profile of a portion of suction side 46 of first airfoil 42A to aid and/or maintain the releasable coupling between mounting apparatus 100 and airfoils 42 of turbine 28.

Second retention component 120 (see, FIGS. 3 and 4) may contact pressure side 44 of second airfoil 42B. In the non-limiting example where second retention component 120 forms curved portion 122, curved portion 122 may directly contact and/or be substantially seated within the portion of pressure side 44 of second airfoil 42B in the inflated state and deflated state of first inflatable pouch 110. That is, mounting apparatus 100 may be inserted and/or positioned between first airfoil 42A and second airfoil 42B, and curved portion 122 may be positioned on, directly contact, maintain contact and/or be seated within the portion of pressure side 44 of second airfoil 42B. In order to directly contact and/or be seated within pressure side 44 of second airfoil 42B, curved portion 122 may include surface 124 that has a geometry and/or shape that may be substantially similar and/or correspond to the portion of pressure side 44 of second airfoil 42B.

Mounting apparatus 100 may be releasably coupled to and/or may be maintained between first airfoil 42A and second airfoil 42B by a compressive force applied by adjustable, first retention component 108 and/or second retention component 120. Specifically in the non-limiting example shown in FIG. 5, once mounting apparatus 100 is positioned between first airfoil 42A and second airfoil 42B, curved portion 122 may apply a circumferential, compressive force (e.g., due to gravity) on pressure side 44 of second airfoil 42B. Subsequently, when first inflatable pouch 110 is in the inflated state, first inflatable pouch 110 may contact, and in turn, apply a circumferential, compressive force against suction side 46 of first airfoil 42A. Additionally, once in the inflated state, first inflatable pouch 110 may apply a circumferential, compressive force toward curved portion 122, which in turn increases the circumferential, compressive force applied to pressure side 44 of second airfoil 42B to releasably couple mounting apparatus 100 to airfoil 42. Once first inflatable pouch 110 is in the deflated state, mounting apparatus 100 may no longer be releasably coupled to airfoils 42, and may be removed from turbine 28.

FIGS. 6-12 show additional, non-limiting examples of mounting apparatus 100. It is understood that similarly numbered and/or named components may function in a substantially similar fashion. Redundant explanation of these components has been omitted for clarity.

Figure 6:
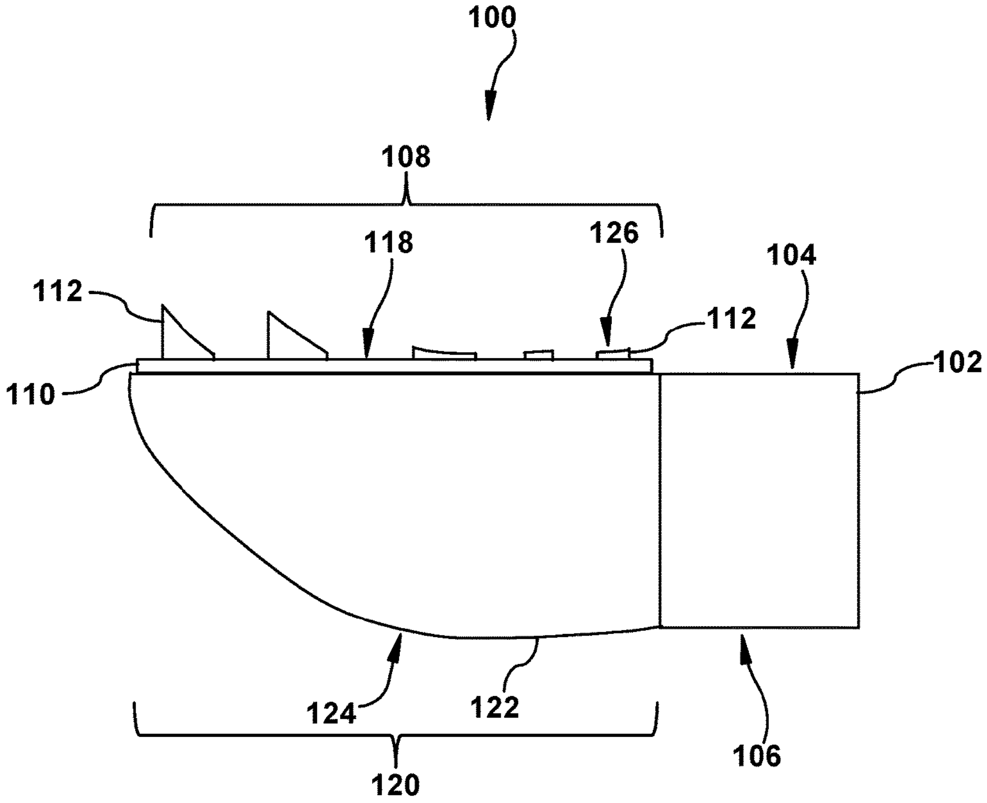
FIG. 6 shows a side view of a mounting apparatus including an inflatable pouch and preformed grip pads, according to additional embodiments.

FIG. 6 shows a side view of mounting apparatus 100 including first inflatable pouch 110 (e.g., adjustable, first retention component 108) and gripping pad(s) 112 formed and/or positioned on first inflatable pouch 110. Distinct from gripping pad(s) 112 shown and discussed herein with respect to FIGS. 3-5, gripping pad(s) 112 shown in FIG. 6 may be formed from a substantially rigid material. That is, gripping pad(s) 112 shown in the non-limiting example in FIG. 6 may be formed from a substantially rigid material, such that when first inflatable pouch 110 is in the inflated state, first inflatable pouch 110 may contour to the portion of suction side 46 of first airfoil 42A, but gripping pad(s) 112 may not. Rather, gripping pad(s) 112 formed from a rigid material may include a geometry 126 that may be substantially similar to and/or may correspond to the shape and/or profile of suction side 46 of first airfoil 42A. As such, when first inflatable pouch 110 is in the inflated state, gripping pad(s) 112 including geometry 126 may directly contact suction side 46 of first airfoil 42A and/or may substantially receive the portion of suction side 46 of first airfoil 42A. In non-limiting examples, gripping pad(s) 112 including geometry 126 may be formed from metal, metal-alloys, ceramic, polymer material (e.g., rubber, plastic), foam, wood and the like.

Figure 7:
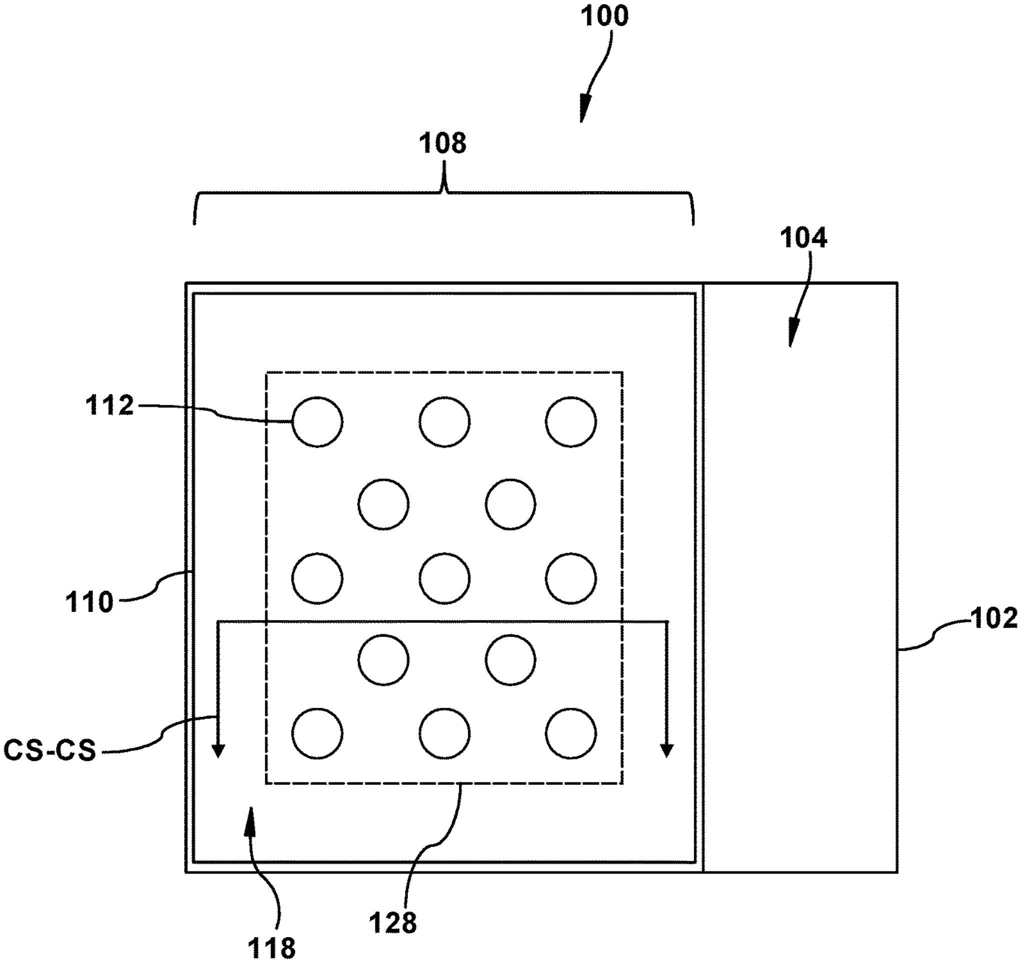
FIG. 7 shows a top view of a mounting apparatus including an inflatable pouch and a preformed insert, according to further embodiments.
Figure 8:
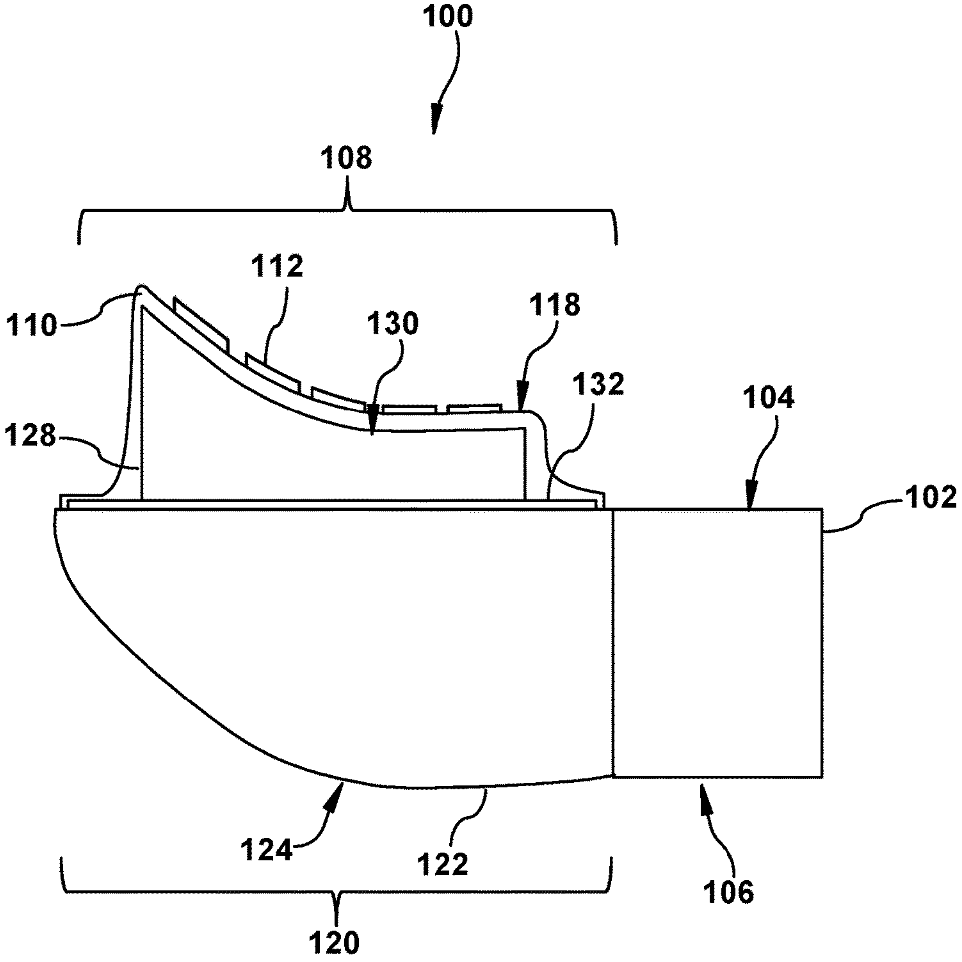
FIG. 8 shows a side cross-sectional view of the mounting apparatus of FIG. 7 taken along line CS-CS in a deflated state, according to embodiments.
Figure 9:
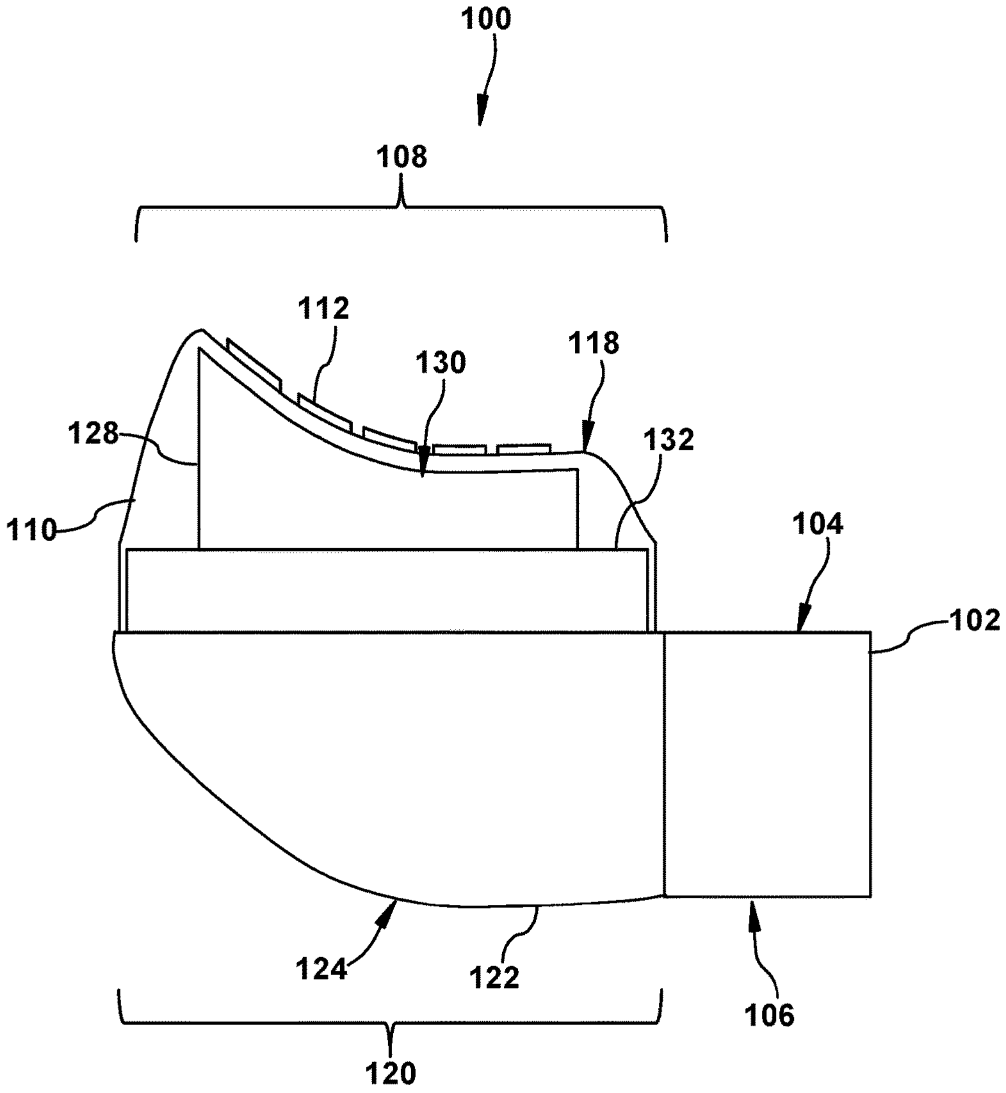
FIG. 9 shows a side cross-sectional view of the mounting apparatus of FIG. 7 taken along line CS-CS in an inflated state, according to embodiments.

FIGS. 7-9 show another non-limiting example of mounting apparatus 100 including an insert 128. Specifically, FIG. 7 shows a top view of mounting apparatus 100 including insert 128, FIG. 8 shows a side cross-sectional view of mounting apparatus 100 including insert 128 in a deflated state, and FIG. 9 shows a side cross-sectional view of mounting apparatus 100 including insert 128 in an inflated state. As shown in FIGS. 7-9, insert 128 may be positioned within first inflatable pouch 110. That is, insert 128 may be positioned on first side 104 of body portion 102, and may be positioned within and/or substantially surrounded by first inflatable pouch 110. In a non-limiting example where insert 128 includes preformed geometry 130, insert 128 may be formed from a substantially rigid material including, but not limited to, metal, metal-alloys, ceramic, polymer material (e.g., rubber, plastic), foam, wood and the like. In another non-limiting example, insert 128 may not include preformed geometry 130 prior to contacting suction side 46 of first airfoil 42A. In this non-limiting example, insert 128 may be formed from a substantially elastic, deformable and/or pliable material, such that when first inflatable pouch 110 and insert 128 contact suction side 46 of first airfoil 42A, insert 128 may substantially contour to a portion of suction side 46 of airfoil 42A to form geometry 130.

As shown in FIGS. 8 and 9, insert 128 positioned within first inflatable pouch 110 may include a predetermined and/or preformed geometry 130. Geometry 130 included on insert 128 may be substantially similar to and/or may correspond to the shape and/or profile of suction side 46 of first airfoil 42A. First inflatable pouch 110 may be configured in the inflated state, and insert 128 including geometry 130 may be displaced toward first airfoil 42A, via an internal inflatable support 132 (see, FIG. 9). Once first inflatable pouch 110 is in the inflated state and insert 128 is displaced via internal inflatable support 132, insert 128 may contact suction side 46 of first airfoil 42A and/or may substantially receive the portion of suction side 46 of first airfoil 42A to aid in releasably coupling mounting apparatus 100 to airfoils 42, as discussed herein.

Figure 10:
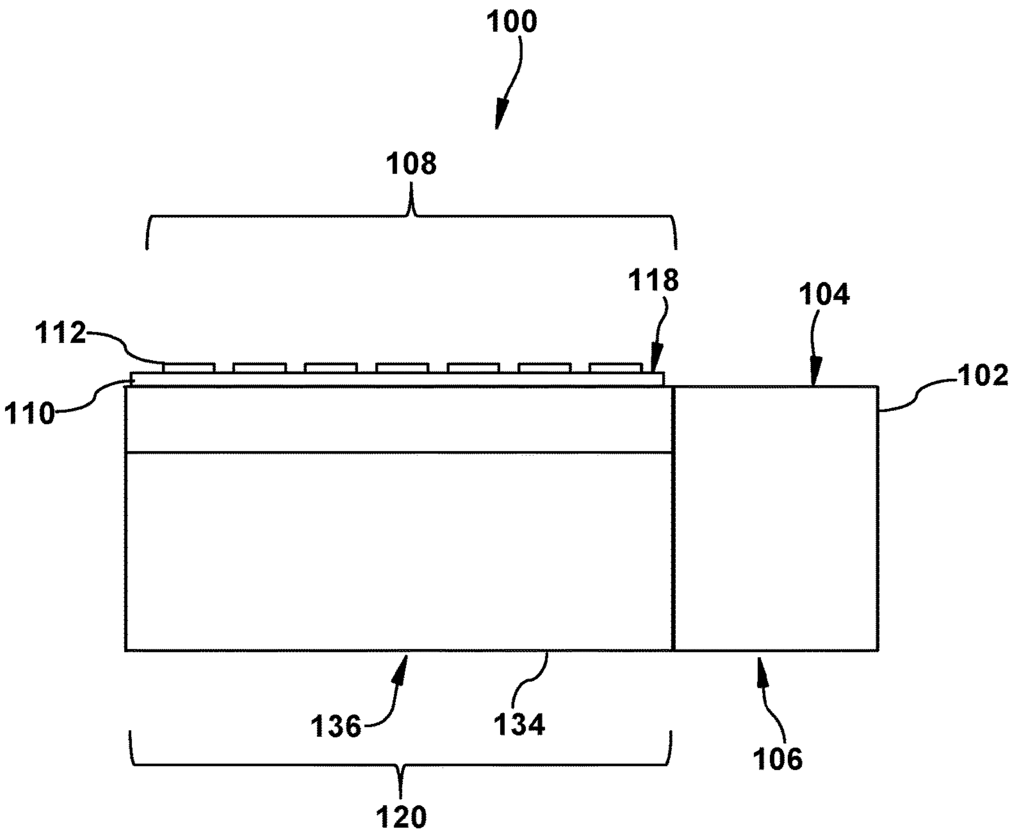
FIG. 10 shows a side view of a mounting apparatus including an inflatable pouch and a flexible component, according to another embodiment.
Figure 11:
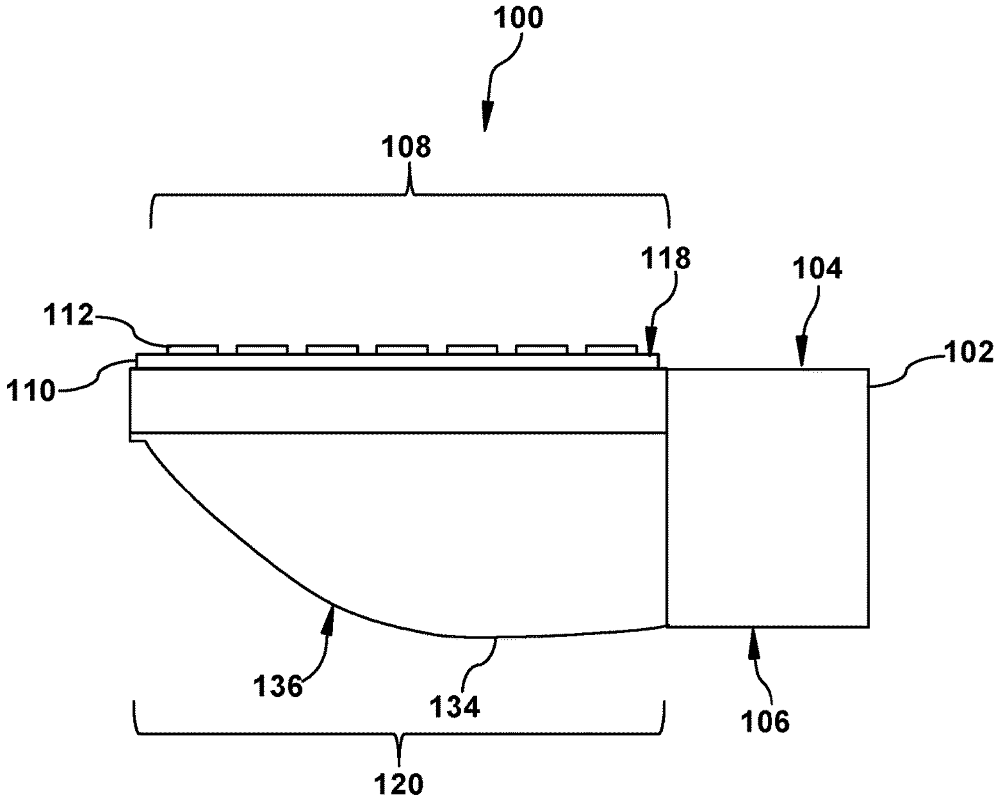
FIG. 11 shows a side view of the mounting apparatus of FIG. 10 including a displaced flexible component, according to another embodiment.

FIGS. 10 and 11 show a non-limiting example of mounting apparatus 100 including a flexible component 134. Specifically, second retention component 120 of mounting apparatus 100 may include flexible component 134 positioned on second side 106 of body portion 102. Flexible component 134 may be formed as a distinct component that may be coupled to or affixed to second side 106 of body portion 102. Flexible component 134 of mounting apparatus 100 may be configured to contact and substantially contour to the portion of pressure side 44 of second airfoil 42B in the inflated and deflated state of first inflatable pouch 110. That is, and in a non-limiting example, flexible component 134 may be formed from a substantially elastic, deformable and/or pliable material, such that when mounting apparatus 100 is positioned between airfoils 42 of turbine 28 (see, FIGS. 2 and 5) flexible component 134 may directly contact and substantially contour to pressure side 44 of second airfoil 42B. By comparison, FIG. 10 shows mounting apparatus 100 including flexible component 134 prior to being positioned between airfoils 42 of turbine 28, and FIG. 11 shows mounting apparatus 100 including flexible component 134 after being inserted and/or positioned airfoils 42 of turbine 28. In FIG. 10, flexible component 134 may be substantially unflexed, and/or uncompressed. Conversely in FIG. 11, once mounting apparatus 100 is positioned between airfoils 42, flexible component 134 may contact pressure side 44 of second airfoil 42B and may be substantially flexed, deformed and/or compressed. Flexing, deforming and/or compressing of flexible component 134 may result in contact surface 136 of flexible component 134 including a shape and/or geometry substantially similar to and/or corresponding to the shape and/or profile of pressure side 44 of second airfoil 42B. Flexible component 134 may be formed from material(s) including, but not limited to, polymer material(s), such as rubber or plastic, foam, and the like.

Figure 12:
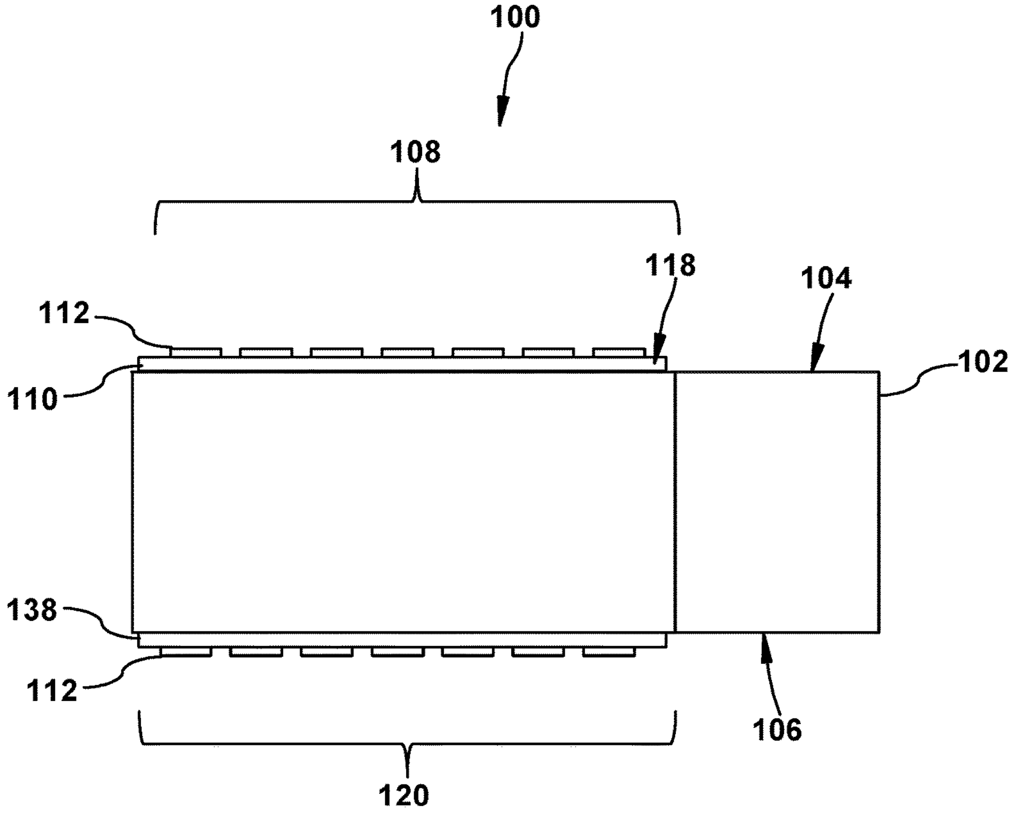
FIG. 12 shows a side view of a mounting apparatus including a first and second inflatable pouch, according to embodiments.

FIG. 12 shows a side view of mounting apparatus 100 including two distinct inflatable pouches 110, 138. As similarly discussed herein with respect to FIGS. 3 and 4, adjustable, first retention component 108 of mounting apparatus 100 shown in FIG. 12 may include first inflatable pouch 110. Additionally as shown in FIG. 12, second retention component 120 may include a distinct or second inflatable pouch 138. Second inflatable pouch 138 may be positioned and/or formed on second side 106 of body portion 102, opposite first side 104 and/or first inflatable pouch 110. In a non-limiting example, second inflatable pouch 138 may include similar features (e.g., gripping pad(s) 112) and/or may function or operate in a substantially similar manner or fashion as first inflatable pouch 110, as discussed herein. That is, second inflatable pouch 138 may be configured to inflate and deflate to aid in the releasable coupling of mounting apparatus 100 to airfoils 42 of turbine 28. Specifically, when second inflatable pouch 138 is in a deflated state, second inflatable pouch 138 may contact and/or be oriented substantially planar with second side 106 of body portion 102. That is, second inflatable pouch 138 may not extend substantially below second side 106 of body portion 102 and may not contact pressure side 44 of second airfoil 42B in the deflated state. In an inflated state (not shown), second inflatable pouch 138 may inflate, grow and/or extend from second side 106 of body portion 102. In the inflated state, second inflatable pouch 138 may inflate, grow and/or extend toward pressure side 44 of second airfoil 42B. As similarly discussed herein with respect to first inflatable pouch 110, second inflatable pouch 138 may contact and substantially counter to the portion of pressure side 44 of second airfoil 42B in the inflated state to aid in releasably coupling mounting apparatus 100 to airfoils 42. Additionally, and as discussed herein, where second retention component 120, and more specifically second inflatable pouch 138, includes gripping pad(s) 112, gripping pad(s) 112 may also contact and substantially counter to the portion of pressure side 44 of second airfoil 42B in the inflated state of second inflatable pouch 138.

Each of the non-limiting examples of mounting apparatuses 100 shown and discussed herein with respect to FIGS. 3-12 may be configured to receive, house and/or include an inspection device (not shown) for turbine 28 of gas turbine system 10 (see, FIG. 1). That is, the example mounting apparatuses 100 shown in FIGS. 3-12 may all be configured to receive, house and/or include an inspection device and may be releasably coupled to and/or may releasably couple the inspection device to airfoils 42 of turbine 28 to perform an inspection process. As discussed herein, the compression fit used to releasably couple mounting apparatuses 100 to airfoils 42 may substantially prevent any slippage, movement and/or uncoupling of mounting apparatuses 100 from airfoils 42 when performing the inspection process using the inspect device positioned on mounting apparatuses 100. Additionally, the compression fit used to releasably couple mounting apparatuses 100 to airfoils 42 may not obstruct and/or prevent movement (e.g., rotation) of airfoils 42 and/or rotor 30 during the inspection process performed by the inspection device positioned on mounting apparatuses 100.

Figure 13:
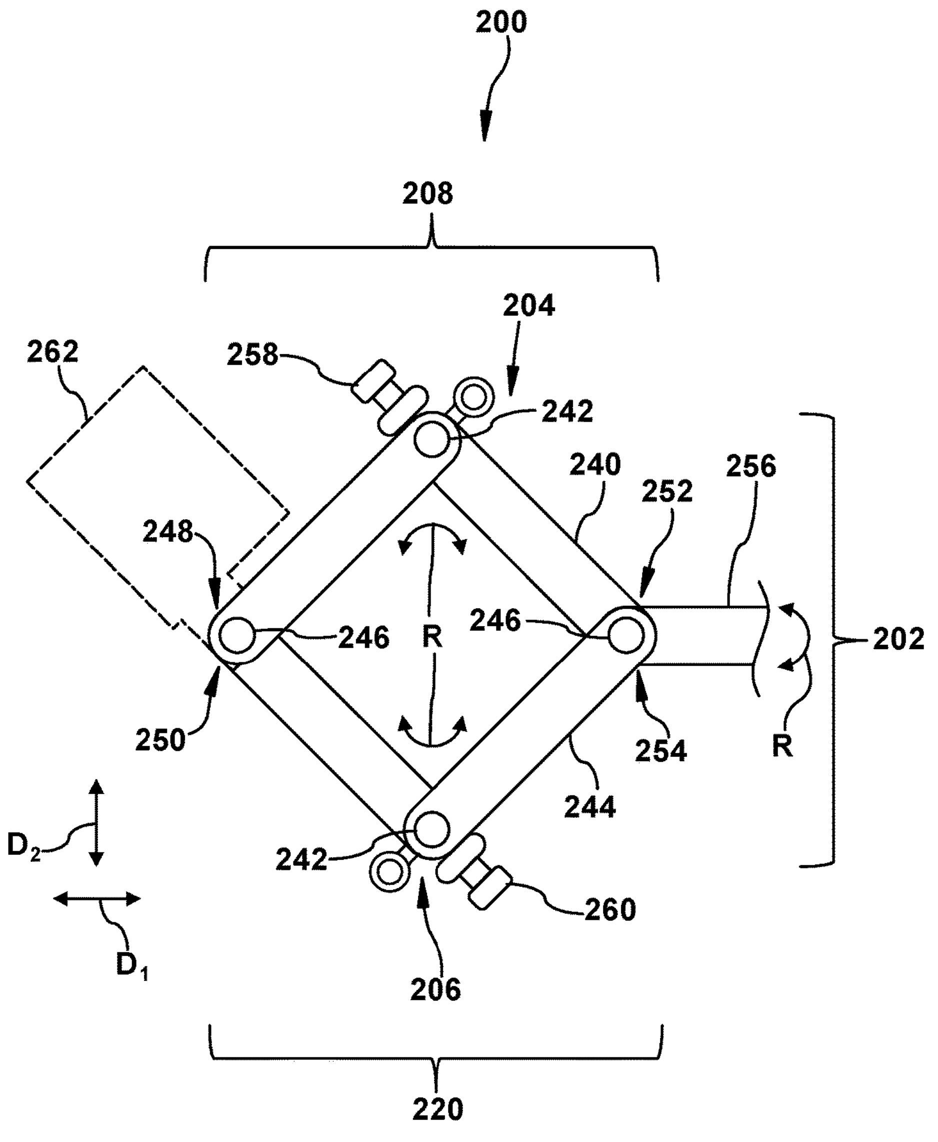
FIG. 13 shows a side view of a mounting apparatus including hinged linkages and pins in an expanded state, according to embodiments.
Figure 14:
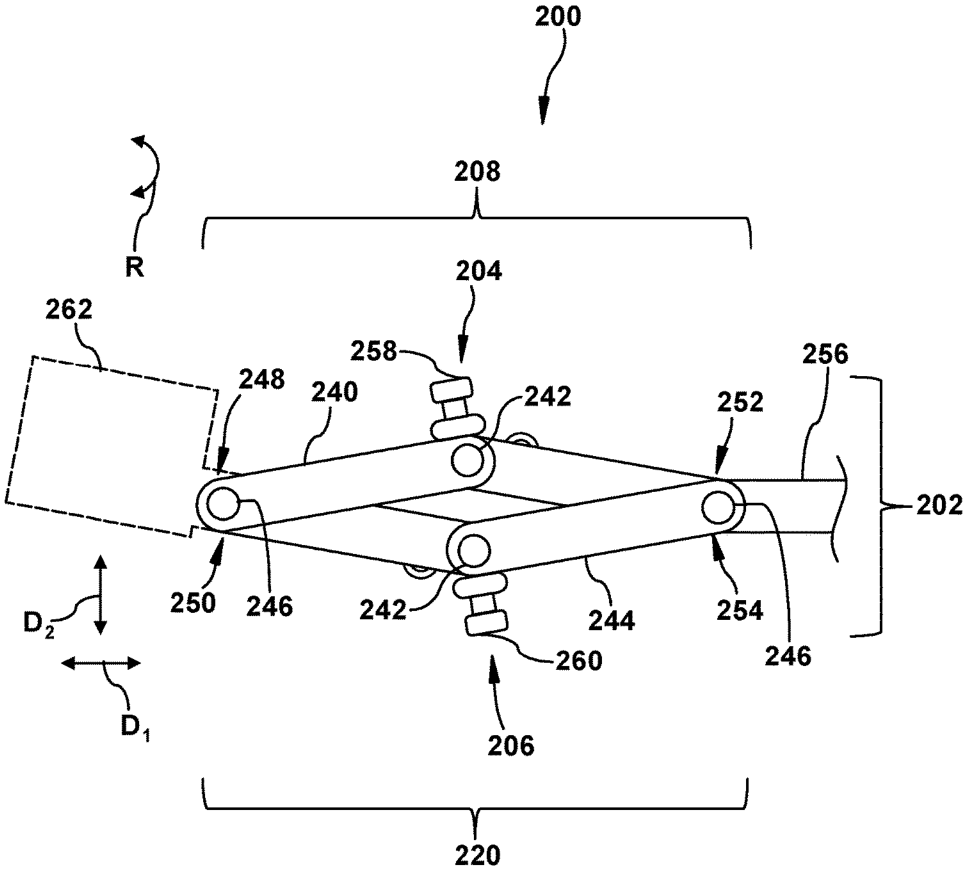
FIG. 14 shows a side view of the mounting apparatus of FIG. 13 in a collapsed state, according to embodiments.

FIGS. 13 and 14 show side views of another non-limiting example of mounting apparatus 200 configured to be coupled with airfoils 42 of turbine 28. Similar to mounting apparatus(es) 100 discussed herein with respect to FIGS. 3-12, mounting apparatus 200 shown in FIGS. 13 and 14 may include body portion 202, adjustable, first retention component 208 formed on first side 204 of body portion 202, and second retention component 220 formed on second side 206 of body portion 202, opposite first side 204. It is understood that similarly numbered and/or named components may function in a substantially similar fashion. Redundant explanation of these components has been omitted for clarity.

However, distinct from mounting apparatus 100, mounting apparatus 200 may include distinct features, components and/or configurations for body portion 202, adjustable, first retention component 208 and/or second retention component 220. In the non-limiting example shown in FIGS. 13 and 14, body portion 202 of mounting apparatus 200 may include a first armature or linkage 240 (hereafter, "first linkage 240") including an linkage hinge 242, and a second linkage 244 including a distinct linkage hinge 242. First linkage 240 may define and/or illustrate first side 204 of body portion 202, and second linkage 244 may define and/or illustrate second side 206 of body portion 202, opposite first side 204. As such, second linkage 244 may be positioned adjacent and/or opposite first linkage 240 in mounting apparatus 200. Each of first linkage 240 and second linkage 244 may include two distinct sections or members pivotally connected and/or pivotally coupled by linkage hinge 242. Although two distinct sections are shown, it is understood that first linkage 240 and/or second linkage 244 may include more sections or members. First linkages 240 and/or second linkages 244 may also include a plurality of linkage hinges 242, where first linkage 240 and/or second linkage 244 include more than two sections or members.

First linkage 240 and second linkage 244 may also be coupled to each other via coupling hinges 246. More specifically, respective, first distal ends 248, 250 of first linkage 240 and second linkage 244 may be pivotally connected and/or pivotally coupled to each other via coupling hinge 246. Additionally, second distal end 252 of first linkage 240 may be pivotally connected and/or pivotally coupled to second distal end 254 of second linkage 244, opposite respective, first distal ends 248, 250, via distinct, coupling hinge 246. As shown in FIGS. 13 and 14, coupling hinge 246 may also pivotally couple second distal ends 252, 254 of first linkage 240 and second linkage 244, respectively, to an extender 256. Extender 256 may also be releasably coupled to distal ends 252, 254 of first linkage 240 and second linkage 244, respectively, to aid in positioning and releasably coupling mounting apparatus 200 to airfoils 42 of turbine 28 (see, FIGS. 2 and 15). That is, and as discussed herein, extender 256 may extend into and/or between airfoils 42 to position mounting apparatus 200 between airfoils 42 so mounting apparatus 200 may subsequently be releasably coupled to airfoils 42. Once mounting apparatus 200 is releasably coupled to airfoils 42, as discussed herein, extender 256 may be uncoupled from first linkage 240 and second linkage 244, respectively, while second distal ends 252, 254 of first linkage 240 and second linkage 244 remain pivotally coupled via coupling hinge 246. Additionally, as a result of coupling hinge 246 coupling first linkage 240 and second linkage 244 to extender 256, first linkage 240 and second linkage 244, collectively, may be configured to rotate about extender 256 in a rotational direction (R).

First linkage 240 and second linkage 244 may be configured to move, positionally shift and/or be adjusted between an expanded state and a collapsed state. Specifically, first linkage 240 and second linkage 244 may be configured to move, positionally shift and/or be adjusted in a first direction ($D_1$) and a second direction ($D_2$) when changing between an expanded state and a collapsed state of first linkage 240 and second linkage 244. In non-limiting examples, FIG. 13 shows first linkage 240 and second linkage 244 in an expanded state and FIG. 14 shows first linkage 240 and second linkage 244 in a collapsed state. In expanded state, as shown in FIG. 13, first linkage 240 may move away from second linkage 244 in the second direction ($D_2$). As a result, first linkage 240 may also move in the first direction ($D_1$) toward extender 256. Additionally, and as discussed herein, first linkage 240 may move toward suction side 46 of first airfoil 42A in the expanded state to aid in releasably coupling mounting apparatus 200 to airfoils 42. As shown in FIG. 13, second linkage 244 may also move away from first linkage 240 in the second direction ($D_2$) in the expanded state. Similar to first linkage 240, second linkage 244 may also move in the first direction ($D_1$) toward extender 256. As also discussed herein, second linkage 244 may move toward pressure side 44 of second airfoil 42*b* in the expanded state to aid in releasably coupling mounting apparatus 200 to airfoils 42.

As shown in FIG. 14, first linkage 240 and second linkage 244 may move, shift and/or be adjusted further or distinctly in a collapsed state. Specifically in the collapsed state, as shown in FIG. 14, first linkage 240 may move toward second linkage 244 in the second direction ($D_2$). As a result, first linkage 240 may also move in the first direction ($D_1$) away from extender 256. Additionally, and as discussed herein, first linkage 240 may away from suction side 46 of first airfoil 42A in the collapsed state to aid in the positioning of mounting apparatus 200 between airfoils 42. As shown in FIG. 14, second linkage 244 may also move toward first linkage 240 in the second direction ($D_2$) in the collapsed state. Similar to first linkage 240, second linkage 244 may also move in the first direction ($D_1$) away from extender 256. As also discussed herein, second linkage 244 may move away from pressure side 44 of second airfoil 42*b* in the collapsed state to aid in positioning mounting apparatus 200 between airfoils 42.

First linkage 240 and second linkage 244 forming body portion 202 of mounting apparatus 200 may be capable of expanding and/or collapsing as a result of hinges 242, 246 and/or the linkage configuration forming body portion 202. That is, based on the pivotal coupling relationships of linkage hinge 242 and coupling hinge 246 discussed herein, as well as, first linkage 240 being coupled to second linkage 244 via a parallelogram linkage, body portion 202 may be configured to move or adjust between the expanded state and the collapsed state. As discussed herein, body portion 202, and specifically first linkage 240 and second linkage 244, may be in the expanded state to aid in the releasable coupling of mounting apparatus 200 to airfoils 42. Additionally, body portion 202, and specifically first linkage 240 and second linkage 244, may be in the collapsed state to aid in the positioning of mounting apparatus 200 between airfoils 42.

As shown in FIGS. 13 and 14, adjustable, first retention component 208 of mounting apparatus 200 may include a first pin 258. First pin 258 may be positioned adjacent to and/or extend from linkage hinge 242 of first linkage 240. Specifically, first pin 258 may be positioned adjacent to and/or extend outward from linkage hinge 242 of first linkage 240, opposite second linkage 244. In a non-limiting example, first pin 258 may be pivotally coupled to linkage hinge 242 of first linkage 240. As a result, first pin 258 may be configured to rotate, at least partially, in a rotational direction (R) about linkage hinge 242 to aid in coupling mounting apparatus 200 to airfoils 42 of turbine 28 (see, FIGS. 2 and 15). That is, and as discussed herein, first pin 258 may be configured to at least partially pivot and/or rotate about linkage hinge 242 of first linkage 240 to be aligned with and substantially contact suction side 46 of first airfoil 42A in the expanded state of first linkage 240 to aid in coupling mounting apparatus 200 to airfoils 42. Additionally, or in a distinct, non-limiting example, first pin 258 may be releasably coupled to linkage hinge 242 of first linkage 240. In the non-limiting example, first linkage 240 may utilize a plurality of differently sized (e.g., length, width, etc.) first pins 258 that may be interchanged and/or releasably coupled to linkage hinge 242 of first linkage 240. Distinct first pins 258 may be interchanged on first linkage 240 to aid in coupling mounting apparatus 200 to various stages of airfoils 42 of turbine 28 that may have different sized gaps or space 38 (see, FIG. 2) between respective airfoils 42.

First pin 258 may be formed from any suitable material, configured as and/or may include any suitable component(s) that may be configured to contact and aid in the coupling of mounting apparatus 200 to airfoils 42, as discussed herein. In a non-limiting example, first pin 258 may be formed from a substantially rigid material including, but not limited to, metal, metal-alloys, ceramic, polymer material (e.g., rubber, plastic), foam, wood and the like. Although shown as being substantially linear, first pin 258, which may contact suction side 46 of first airfoil 42A, may include a surface including a geometry and/or shape that may be substantially similar and/or correspond to the portion of suction side 46 of first airfoil 42A.

In the non-limiting example shown in FIGS. 13 and 14, second retention component 220 of mounting apparatus 200 may include a second pin 260. Second pin 260 may be structured, built and/or operate substantially similar or identical to first pin 258 forming adjustable, first retention component 208. For example, second pin 260 may be positioned adjacent to and/or extend from linkage hinge 242 of second linkage 244. Specifically, second pin 260 may be positioned adjacent to and/or extend outward from linkage hinge 242 of second linkage 244, opposite first linkage 240 and/or first pin 258. In a non-limiting example, second pin 260 may be pivotally coupled to linkage hinge 242 of second linkage 244. As a result, second pin 260 may be configured to rotate, at least partially, in a rotational direction (R) about linkage hinge 242 to aid in coupling mounting apparatus 200 to airfoils 42 of turbine 28 (see, FIGS. 2 and 15). That is, and as discussed herein, second pin 260 may be configured to at least partially pivot and/or rotate about linkage hinge 242 of second linkage 244 to be aligned with and substantially contact pressure side 44 of second airfoil 42B in the expanded state of second linkage 244 to aid in coupling mounting apparatus 200 to airfoils 42. Additionally, or in a distinct, non-limiting example, second pin 260 may be releasably coupled to linkage hinge 242 of second linkage 244. In the non-limiting example, second linkage 244 may utilize a plurality of differently sized (e.g., length, width, etc.) second pins 260 that may be interchanged and/or releasably coupled to linkage hinge 242 of second linkage 244. Distinct second pins 260 may be interchanged on second linkage 244 to aid in coupling mounting apparatus 200 to various stages of airfoils 42 of turbine 28 that may have different sized gaps or space 38 (see, FIG. 2) between respective airfoils 42.

Similar to first pin 258, second pin 260 may be formed from any suitable material, configured as and/or may include any suitable component(s) that may be configured to contact and aid in the coupling of mounting apparatus 200 to airfoils 42, as discussed herein. In a non-limiting example, second pin 260 may be formed from a substantially rigid material including, but not limited to, metal, metal-alloys, ceramic, polymer material (e.g., rubber, plastic), foam, wood and the like. Although shown as being substantially linear, second pin 260, which may contact pressure side 44 of second airfoil 42B, may include a surface including a geometry and/or shape that may be substantially similar and/or correspond to the portion of pressure side 44 of second airfoil 42B.

As shown in FIGS. 13 and 14, mounting apparatus 200 may also include platform 262, shown in phantom as optional. Platform 262 may be releasably and/or pivotally coupled to coupling hinge 246 between first linkage 240 and second linkage 244. Additionally, platform 262 may be releasably and/or pivotally coupled to coupling hinge 246 opposite extender 256. Platform may be configured as any suitable component or feature that may receive an inspection device (not show) utilized to inspect turbine 28. That is, platform 262 may be formed as any suitable component or feature that may be configured to receive, house and/or include an inspection device (not shown) for turbine 28 of gas turbine system 10 (see, FIG. 1), as discussed herein.

Figure 15:
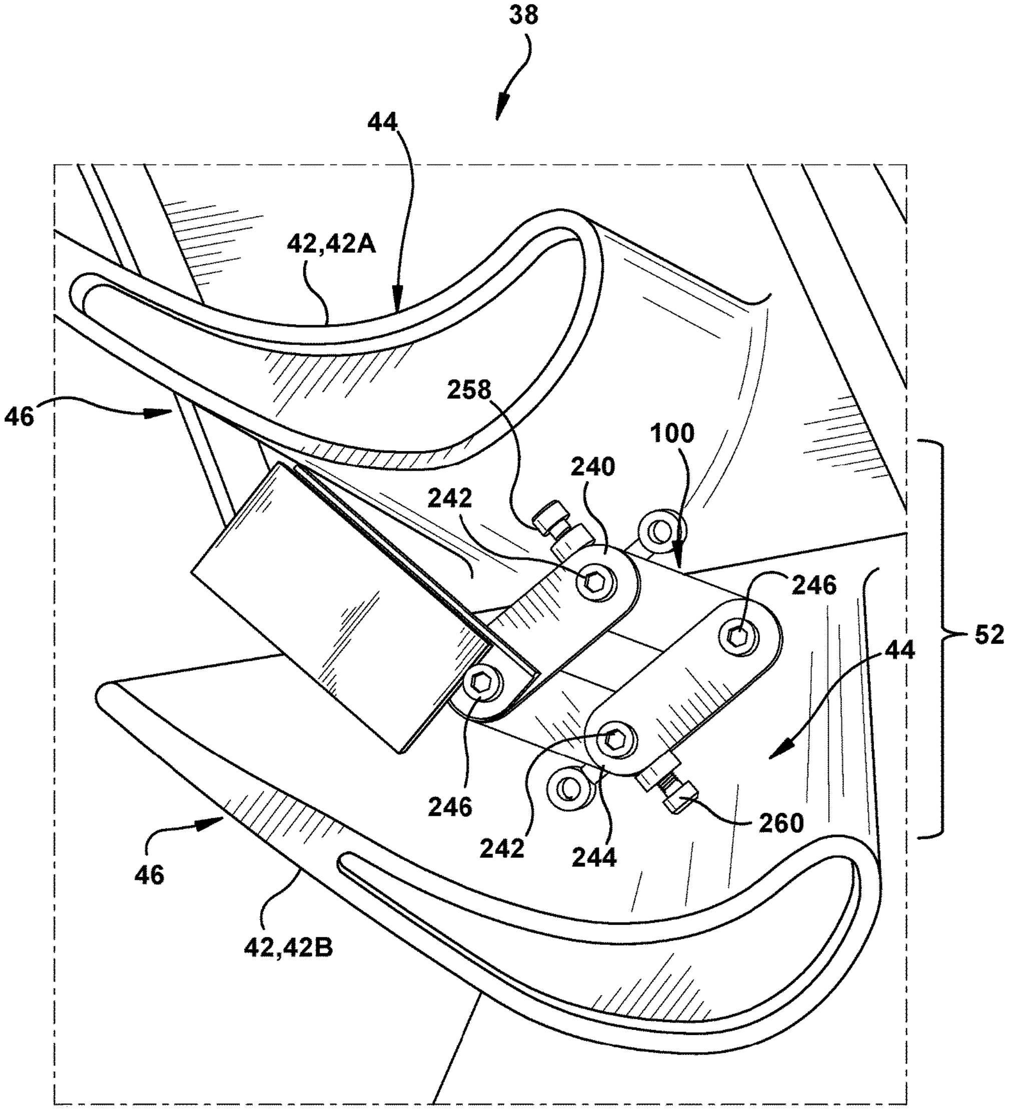
FIG. 15 shows a perspective view of the mounting apparatus of FIG. 13 releasably coupled to airfoils of a turbine of a gas turbine system, according to embodiments.

Turning to FIG. 15, mounting apparatus 200 of FIGS. 13 and 14 is depicted as being releasably coupled to airfoils 42 of turbine 28 of gas turbine system 10 (see, FIG. 1). That is, mounting apparatus 200 may be positioned within space 52 formed between first airfoil 42A and second airfoil 42B, and may be releasably coupled to first airfoil 42A and second airfoil 42B, respectively. As shown in FIG. 15, adjustable, first retention component 208 may contact suction side 46 of first airfoil 42A. In the non-limiting example where adjustable, first retention component 208 is formed as first pin 258, first pin 258 may substantially rotate about linkage hinge 242 and contact suction side 46 of first airfoil 42A when in an expanded state to aid in releasably coupling mounting apparatus 100 to airfoils 42. That is, mounting apparatus 200 may be inserted and/or positioned between first airfoil 42A and second airfoil 42B while first linkage 240 and second linkage 244 are in a collapsed state (see, FIG. 14). Once positioned between first airfoil 42A and second airfoil 42B, first pin 258 may move or expand toward suction side 46 of first airfoil 42A, via first linkage 240, and first pin 258 may contact suction side 46 of first airfoil 42A. In addition to contacting suction side 46 of first airfoil 42A, first pin 258 may substantially rotate about linkage hinge 242 in the rotational direction (R) based on the shape and/or profile of a portion of suction side 46 of first airfoil 42A, to ensure and/or improve contact between first pin 258 and suction side 46. The rotation of first pin 258 to ensure and/or improve contact between first pin 258 and suction side 46 of first airfoil 42A may ultimately aid and/or maintain the releasable coupling between mounting apparatus 200 and airfoils 42 of turbine 28, as discussed herein.

Additionally as shown in FIG. 15, second retention component 220 may contact pressure side 44 of second airfoil 42B. In the non-limiting example where second retention component 220 is second pin 260, second pin 260 may directly contact a portion of pressure side 44 of second airfoil 42B in a similar manner as first pin 258 contacting suction side 46 of first airfoil 42A. That is, mounting apparatus 200 may be inserted and/or positioned between first airfoil 42A and second airfoil 42B while first linkage 240 and second linkage 244 are in a collapsed state (see, FIG. 14). As similarly discussed herein with respect to first pin 258, once positioned between first airfoil 42A and second airfoil 42B, second pin 260 may move or expand toward pressure side 44 of second airfoil 42B, via second linkage 244, and second pin 260 may contact pressure side 44 of second airfoil 42*b*. In addition to contacting pressure side 44 of second airfoil 42*b*, second pin 260 may substantially rotate about linkage hinge 242 in the rotational direction (R) based on the shape and/or profile of a portion of pressure side 44 of second airfoil 42B, to ensure and/or improve contact between second pin 260 and pressure side 44. The rotation of second pin 260 to ensure and/or improve contact between second pin 260 and pressure side 44 of second airfoil 42*b* may ultimately aid and/or maintain the releasable coupling between mounting apparatus 200 and airfoils 42 of turbine 28, as discussed herein.

Similar to mounting apparatus 100 discussed herein with respect to FIG. 5, mounting apparatus 200 may be releasably coupled to and/or may be maintained between first airfoil 42A and second airfoil 42B by a compressive force applied by adjustable, first retention component 208 and/or second retention component 220. Specifically in the non-limiting example shown in FIG. 15, once first linkage 240 and second linkage 244 of mounting apparatus 200 are in an expanded state (see, FIGS. 13 and 15), first pin 258 on first linkage 240 may apply a circumferential, compressive force on suction side 46 of first airfoil 42A, and second pin 260 on second linkage 244 may apply a circumferential, compressive force on pressure side 44 of second airfoil 42B. Once first linkage 240 and second linkage 244 of mounting apparatus 200 are in a collapsed state (see, FIG. 14), mounting apparatus 200 may no longer be releasably coupled to airfoils 42, and may be removed from turbine 28.

Figure 16:
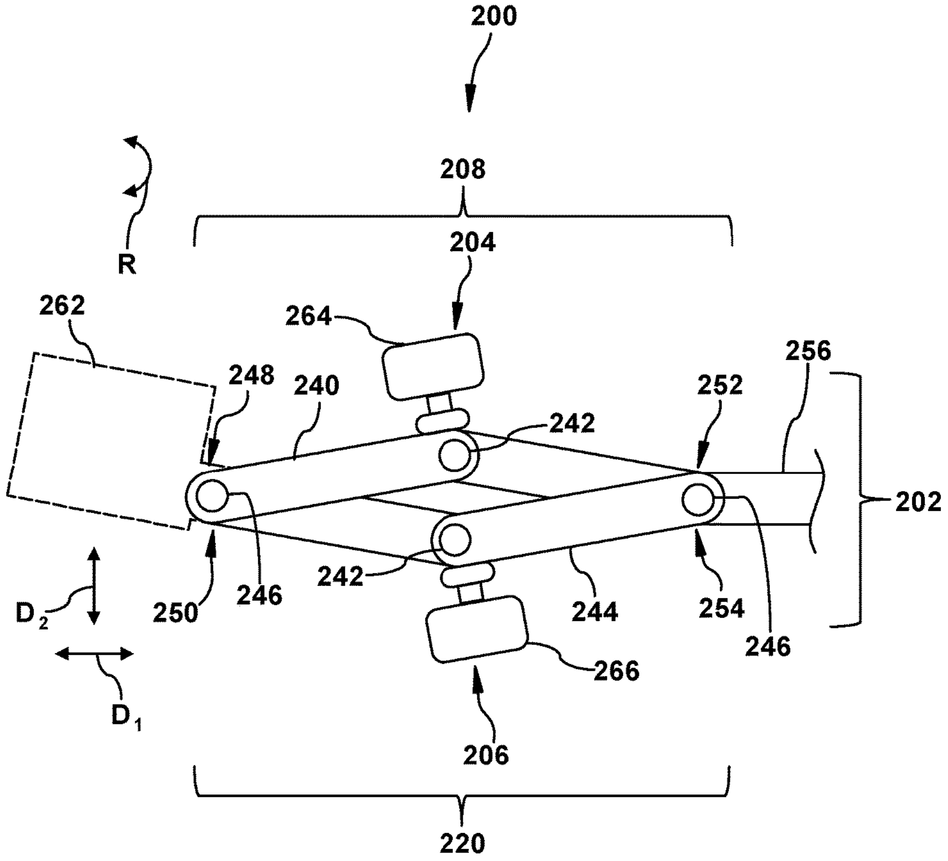
FIG. 16 shows a side view of a mounting apparatus including hinged linkages and pliable components in a collapsed state, according to embodiments.
Figure 17:
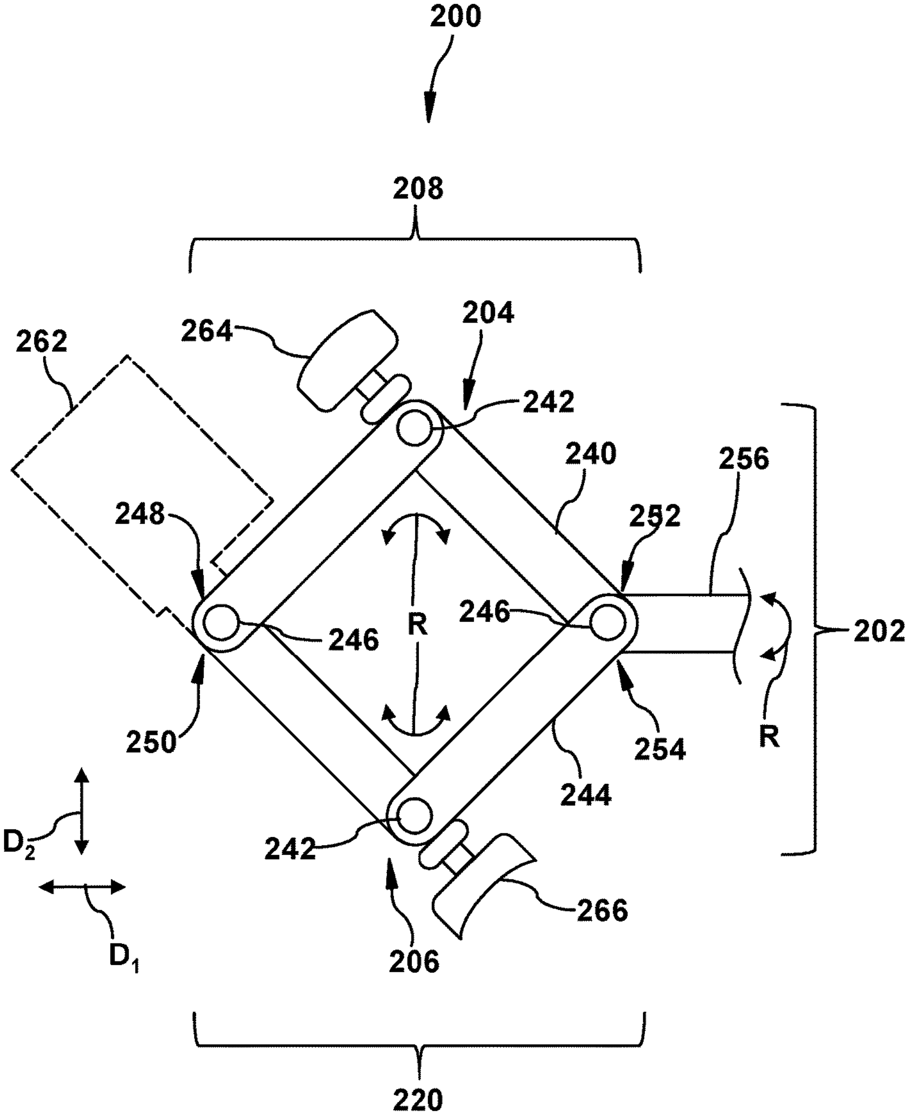
FIG. 17 shows a side view of the mounting apparatus of FIG. 16 in an expanded state, according to embodiments.
Figure 18:
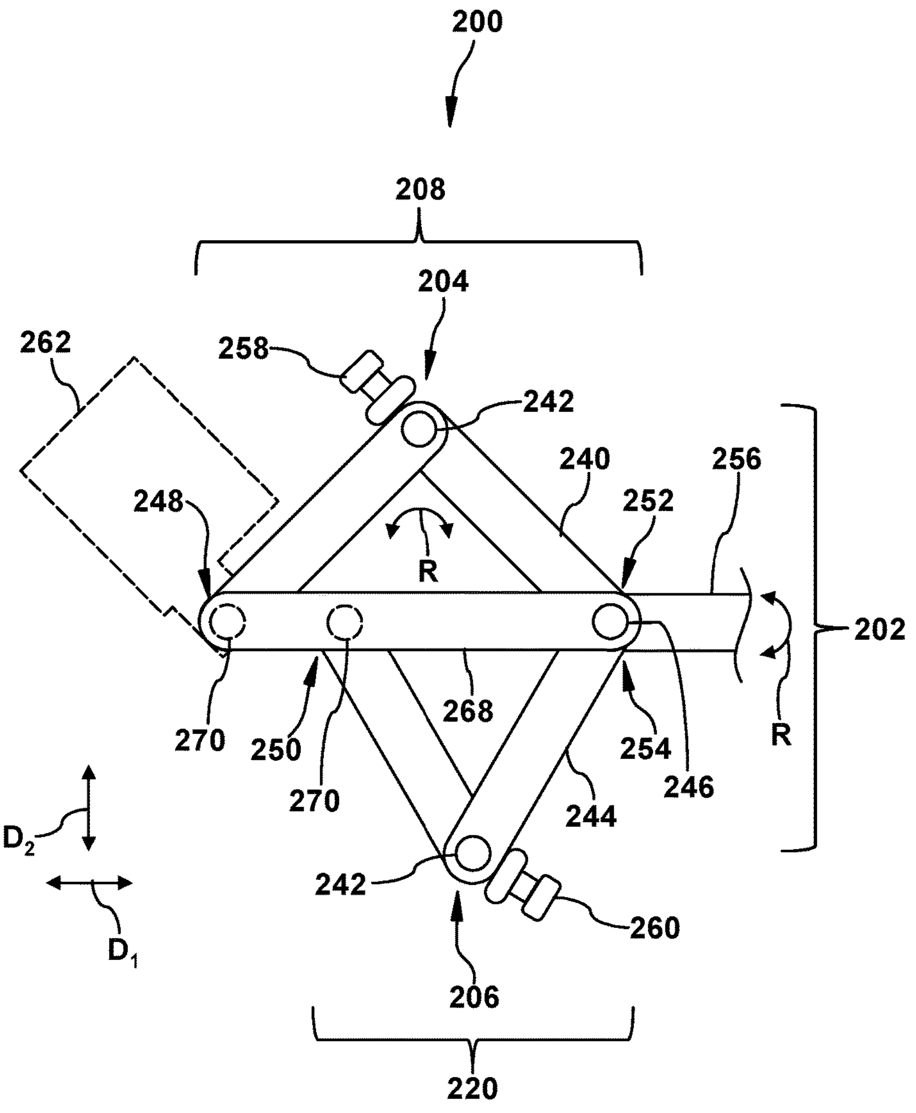
FIG. 18 shows a side view of a mounting apparatus including hinged linkages, pins and a rigid support, according to embodiments.

FIGS. 16-18 show additional, non-limiting examples of mounting apparatus 200. It is understood that similarly numbered and/or named components may function in a substantially similar fashion. Redundant explanation of these components has been omitted for clarity.

In the non-limiting example shown in FIGS. 16 and 17, mounting apparatus 200 may include pliable components 264, 266. Adjustable, first retention component 208 of mounting apparatus 200 may include a first pliable component 264, and second retention component 220 may include a second pliable component 266. First pliable component 264 may be coupled to and may extend from linkage hinge 242 of first linkage 240, opposite from second linkage 244. Additionally, second pliable component 266 may be coupled to and may extend from linkage hinge 242 of second linkage 244, opposite from first linkage 240. Both first pliable component 264 and second pliable component 266 may be configured to contact and substantially contour to respective airfoils 42 of turbine 28 (see, FIG. 2) when releasably coupling mounting apparatus 200 to airfoils 42, as discussed herein. Specifically, first pliable component 264 may be configured to contact and substantially contour to the portion of suction side 46 of first airfoil 42A in the expanded state of first linkage 240. Additionally, second pliable component 266 may be configured to contact and substantially contour to the portion of pressure side 44 of second airfoil 42B in the expanded state of second linkage 244. By contouring to the respective side of airfoil 42, first pliable component 264 and second pliable component 266 may be substantially flexed, deformed and/or compressed. Flexing, deforming and/or compressing may first pliable component 264 and second pliable component 266 result in first pliable component 264 and second pliable component 266 including a shape and/or geometry substantially similar to and/or corresponding to the shape and/or profile of the respective side of the contacted airfoil 42. That is, and as shown in FIG. 17, first pliable component 264 may be substantially flexed, deformed and/or compressed, and may include a shape and/or geometry substantially similar to and/or corresponding to the shape and/or profile of the suction side 46 of first airfoil 42A. Additionally, and as shown in FIG. 17, second pliable component 266 may be substantially flexed, deformed and/or compressed, and may include a shape and/or geometry substantially similar to and/or corresponding to the shape and/or profile of the pressure side 44 of second airfoil 42B. In non-limiting examples, first pliable component 264 and second pliable component 266 may be formed from a substantially elastic, deformable and/or pliable material(s) including, but not limited to, polymer material(s), such as rubber or plastic, foam, and the like.

FIG. 18 shows a side view of a non-limiting example of mounting apparatus 200 including a rigid support 268. As shown in FIG. 18, rigid support 268 may be coupled to extender 256 via coupling hinge 246. In a non-limiting example, rigid support 268 may be releasably coupled and positionally affixed (e.g., no rotation) to extender 256. In another non-limiting example, rigid support 268 may be releasably coupled to and configured to rotate in a rotational direction (R) about extender 256. Additionally, rigid support 268 may be positioned between first linkage 240 and second linkage 244, and may be coupled to first linkage 240 and second linkage 244. First linkage 240 and second linkage 244 may be slideably coupled to and/or may slidingly engage rigid support 268 via sliders 270. Sliders 270 may be positioned on first distal ends 248, 250 of first linkage 240 and second linkage 244, respectively, and may slidingly engage rigid support 268 to allow first linkage 240 and second linkage 244 to move in a first direction ($D_1$) and/or second direction ($D_2$) independent of one another. In the non-limiting example shown in FIG. 18, second distal ends 252, 254 of first linkage 240 and second linkage 244, respectively, may be fixed to rigid support 268.

FIGS. 19-26 show various views of additional non-limiting examples of mounting apparatus 300 configured to be coupled with airfoil(s) 42 of turbine 28. Similar to mounting apparatuses 100, 200 discussed herein with respect to FIGS. 3-18, mounting apparatus 300 shown in FIGS. 19-26 may include body portion 302, adjustable, first retention component 308, and second retention component 220 formed on body portion 302. It is understood that similarly numbered and/or named components may function in a substantially similar fashion. Redundant explanation of these components has been omitted for clarity.

Figure 19:
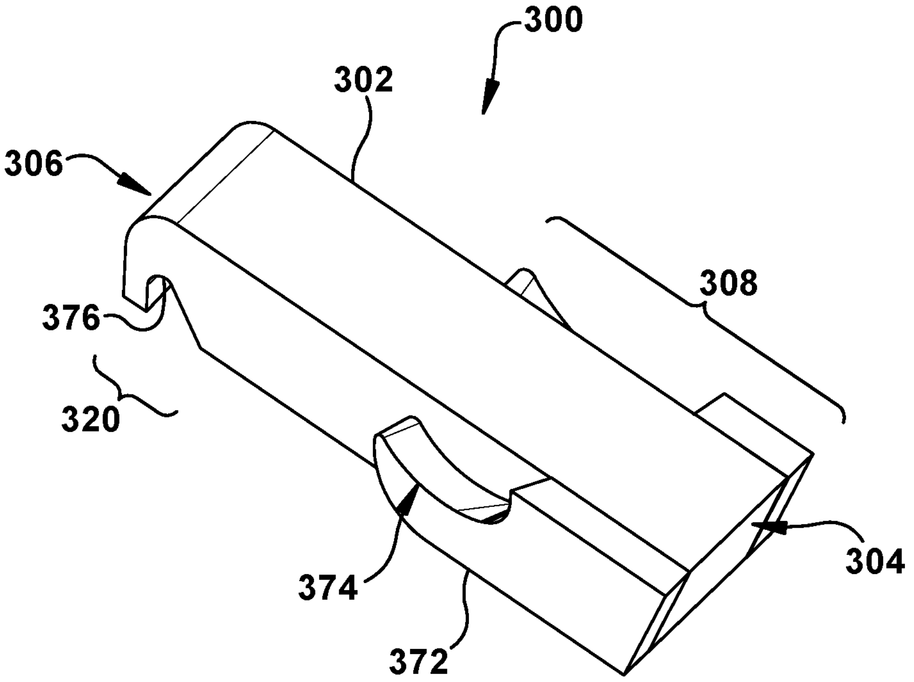
FIG. 19 shows a perspective view of a mounting apparatus including a fixed retention component and a pivotal retention component, according to embodiments.
Figure 20:
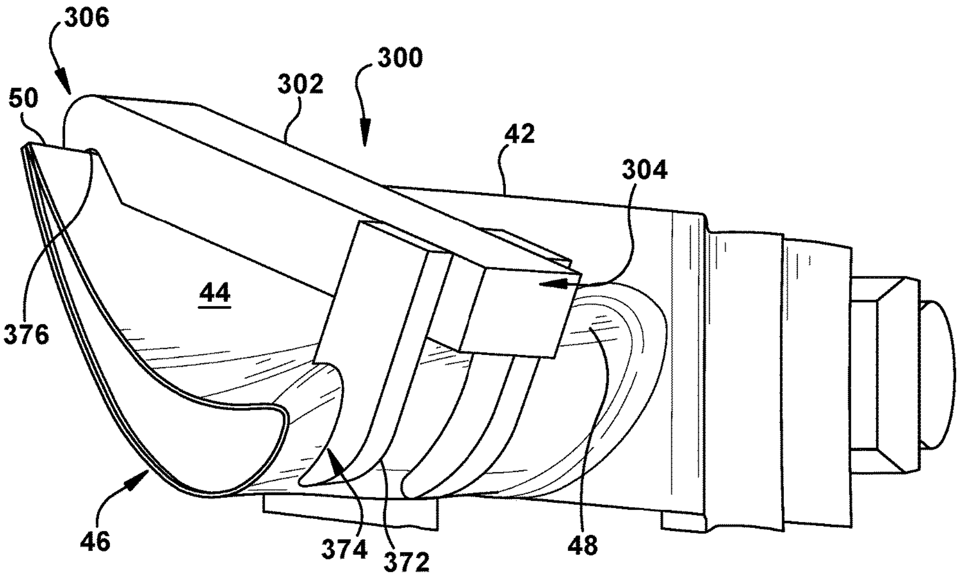
FIG. 20 shows a perspective view of the mounting apparatus of FIG. 19 releasably coupled to a turbine blade, according to embodiments.

FIGS. 19 and 20 show perspective views of mounting apparatus 300. Specifically, FIG. 19 shows a perspective view of mounting apparatus 300 and FIG. 20 shows a perspective view of mounting apparatus 300 releasably coupled to airfoil 42. Adjustable, first retention component 308 formed on body portion 302 may include at least one swivel clasp 372. In the non-limiting example, mounting apparatus 300 may include two distinct swivel clasps 372 that may move together or concurrently, or may move independent of one another. As shown in FIGS. 19 and 20, swivel clasps 372 may be configured to rotate in a rotational direction (R) about and/or adjacent first side 304 of body portion 302. Swivel clasps 372 may also include a contact surface 374 that may include a geometry and/or shape that may be substantially similar and/or correspond to the portion of airfoil 42 that swivel clasps 372 may contact to releasably couple mounting apparatus 300 to airfoil 42. Specifically as shown in FIG. 20, contact surface 374 of swivel clasps 372 may include a geometry and/or shape that may be substantially similar and/or correspond to leading edge 48, a portion of pressure side 44 and/or a portion of suction side 46 of airfoil 42. The corresponding geometry of contact surface 374 of swivel clasps 372 may aid in the releasably coupling of mounting apparatus 300 to airfoil 42, as discussed herein. In a non-limiting example, swivel clasps 372 may provide a compressive force against and/or on leading edge 48, a portion of pressure side 44 and/or a portion of suction side 46 of airfoil 42 to mounting apparatus 300. The compressive force may be applied to airfoil 42 via a spring or other suitable feature that may apply a similar compressive force. Although two swivel clasps 372 are shown and discussed herein, it is understood that mounting apparatus 300 may include more or less swivel clasps utilized to releasably couple mounting apparatus 300 to airfoil 42.

Additionally, second retention component 320 formed on body portion 302 may include a recess 376 formed therein. Specifically, recess 376 may be formed in and/or partially through body portion 302 at and/or adjacent to second side 306. Additionally, recess 376 may be formed opposite swivel clasps 372 of mounting apparatus 300. In a non-limiting example, recess 376 may include a geometry and/or shape that may be substantially similar and/or correspond to the portion of airfoil 42 that recess 376 may contact and/or receive to releasably couple mounting apparatus 300 to airfoil 42. Specifically, and as shown in FIGS. 19 and 20, recess 376 may include a geometry and/or shape that may be substantially similar and/or correspond to trailing edge 50, a portion of pressure side 44 and/or a portion of suction side 46 of airfoil 42. As such, trailing edge 50, a portion of pressure side 44 and/or a portion of suction side 46 of airfoil 42 may be substantially received and/or positioned within recess 376 when mounting apparatus 300 is releasably coupled to airfoil 42 (see, FIG. 20). The corresponding geometry of recess 376 may aid in the releasably coupling of mounting apparatus 300 to airfoil 42, as discussed herein.

Figure 21:
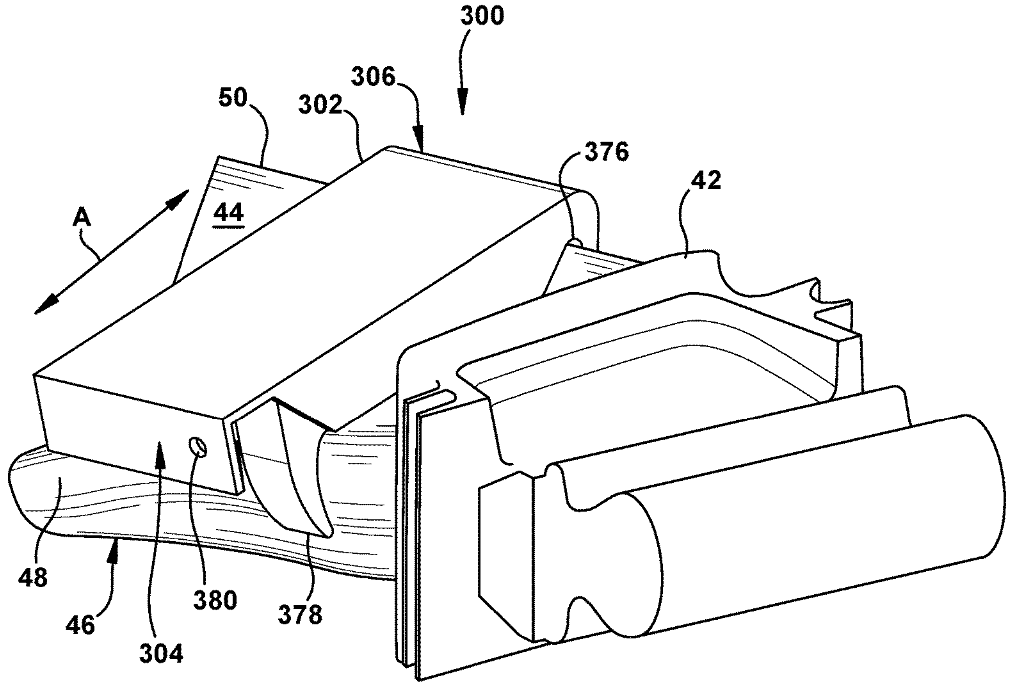
FIG. 21 shows a perspective view of a mounting apparatus including a fixed retention component and an adjustable retention component releasably coupled to a turbine blade, according to embodiments.

FIG. 21 shows a perspective view of another non-limiting example of mounting apparatus 300 releasably coupled to airfoil 42. Mounting apparatus 300 shown in FIG. 21 may include substantially similar features and/or components as mounting apparatus 300 shown and discussed herein with respect to FIGS. 19 and 20. For example, mounting apparatus 300 of FIG. 21 may include recess 376 may be formed in and/or partially through body portion 302 at and/or adjacent to second side 306.

Distinct from mounting apparatus 300 shown in FIGS. 19 and 20, adjustable, first retention component 308 of mounting apparatus 300 shown in FIG. 21 may include adjustable clasp 378. As shown in FIG. 21, adjustable clasp 378 may be positioned and/or formed on first side 304 of body portion 302. In the non-limiting example, adjustable clasp 378 may only span over a portion (of the width) of body portion 302. As such, the remaining portion of first side 304 of body portion 302 may rest on and/or adjacent leading edge 48, or alternatively, may be positioned above and/or substantially separate from leading edge 48. In another non-limiting example, the remaining portion of first side 304 that does not include adjustable clasp 378 may include a recess (not shown) similar to recess 376 formed on second side 306 of body portion 302. The recess formed on first side 304, adjacent adjustable clasp 378 may be configured to receive at least a portion of leading edge 48, pressure side 44 of airfoil 42 and/or suction side 46 of airfoil 42.

Adjustable clasp 378 may be configured to move in an axial direction (A) toward leading edge 48 to releasably couple mounting apparatus 300 to airfoil 42. Adjustable clasp 378 may be configured to move in the axial direction (A) using any suitable positional adjustment feature, component and/or mechanism. In a non-limiting example shown in FIG. 21, adjustable clasp 378 may be coupled to and/or in mechanical communication with a threaded screw 380, which may rotate and/or be driven to adjust the axial position of adjustable clasp 378. Threaded screw 380 may be positioned axially across mounting apparatus 300 and/or may extend from first side 304 to second side 306. When rotated, threaded screw 380 may move adjustable clasp 378 in the axial direction (A) to move closer to and/or contact airfoil 42, or alternatively, move adjustable clasp 378 away from airfoil 42.

Adjustable clasp 378 may also include contact surface 374 similar to contact surface 374 of swivel clasp 372 (see, FIGS. 19 and 20). That is, contact surface 374 of adjustable clasp 378 may include a geometry and/or shape that may be substantially similar and/or correspond to the portion of airfoil 42 that adjustable clasps 378 may contact to releasably couple mounting apparatus 300 to airfoil 42. Specifically as shown in FIG. 21, contact surface 374 of adjustable clasp 378 may include a geometry and/or shape that may be substantially similar and/or correspond to leading edge 48, a portion of pressure side 44 and/or a portion of suction side 46 of airfoil 42. The corresponding geometry of contact surface 374 of adjustable clasp 378 may aid in the releasably coupling of mounting apparatus 300 to airfoil 42, as discussed herein. In a non-limiting example, adjustable clasp 378 may provide a compressive force against and/or leading edge 48, a portion of pressure side 44 and/or a portion of suction side 46 of airfoil 42 to mounting apparatus 300.

Figure 22:
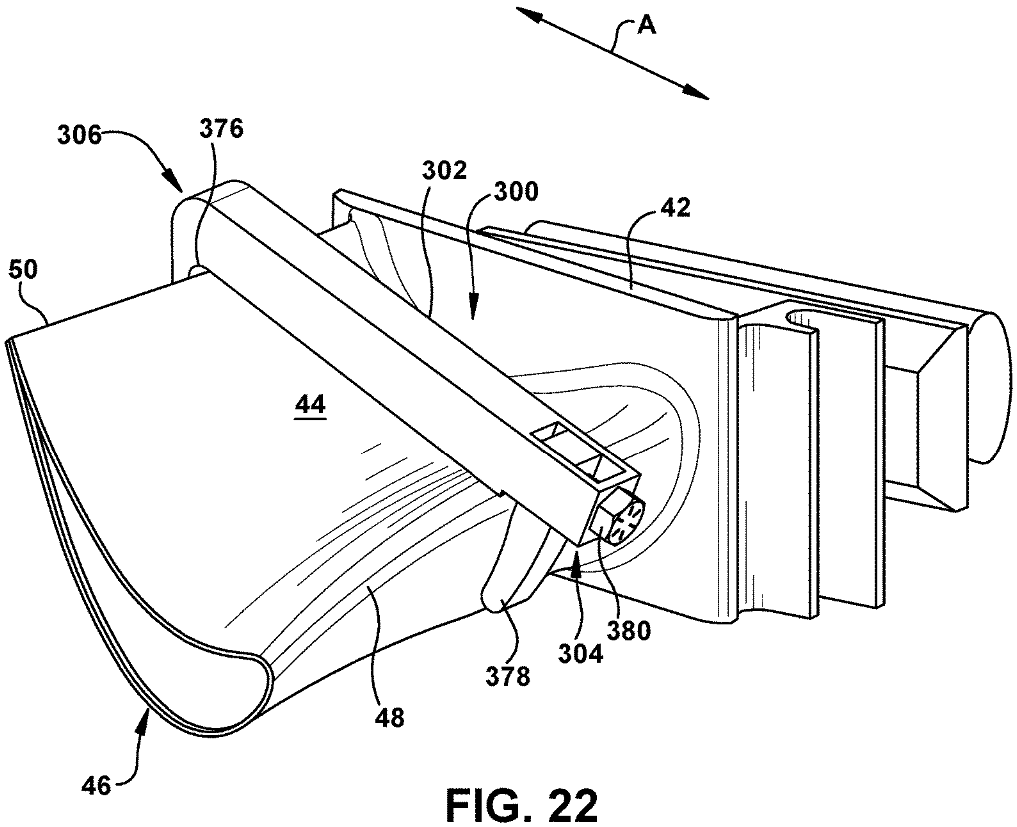
FIG. 22 shows a perspective view of a mounting apparatus including a fixed retention component and an adjustable retention component releasably coupled to a turbine blade, according to additional embodiments.

FIG. 22 shows a perspective view of an additional non-limiting example of mounting apparatus 300 releasably coupled to airfoil 42. Mounting apparatus 300 shown in FIG. 22 may include substantially similar features and/or components as mounting apparatus 300 shown and discussed herein with respect to FIG. 21. For example, mounting apparatus 300 of FIG. 22 may include recess 376 formed in and/or partially through body portion 302 at and/or adjacent to second side 306. Additionally, mounting apparatus 300 of FIG. 22 may also include adjustable clasp 378 including a contact surface 374 that may be moved axially via threaded screw 380 to contact airfoil 42 when coupling mounting apparatus 300 to airfoil 42. Similarly numbered and/or named components may function in a substantially similar fashion. Redundant explanation of these components has been omitted for clarity.

However, distinct from mounting apparatus 300 shown in FIG. 21, adjustable clasp 378 of mounting apparatus 300 shown in FIG. 22 may span substantially over the entire width of body portion 302. More specifically, adjustable clasp 378 may span over the entire width of first side 304 of body portion 302 for mounting apparatus 300. With comparison to previously discussed mounting apparatuses 300 shown in FIGS. 19-21, mounting apparatus 300 shown in FIG. 22 may have a smaller total or overall width.

Figure 23:
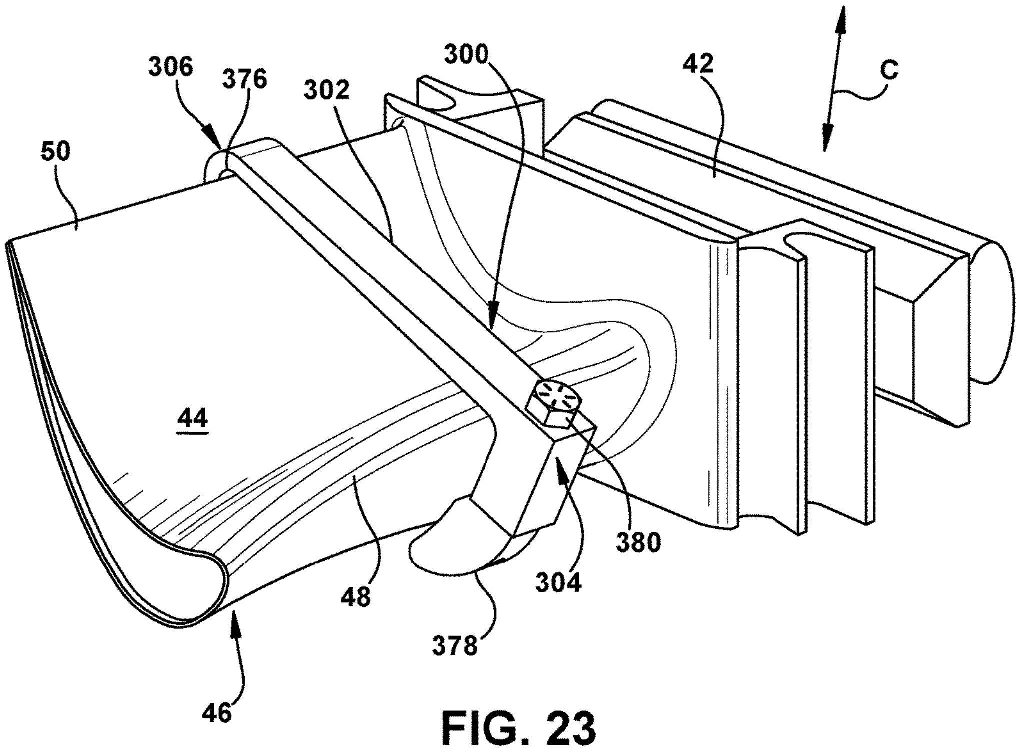
FIG. 23 shows a perspective view of a mounting apparatus including a fixed retention component and an adjustable retention component releasably coupled to a turbine blade, according to further embodiments.

FIG. 23 shows a perspective view of a non-limiting example of mounting apparatus 300 releasably coupled to airfoil 42. Mounting apparatus 300 shown in FIG. 23 may include substantially similar features and/or components as mounting apparatus 300 shown and discussed herein with respect to FIG. 22. For example, mounting apparatus 300 of FIG. 23 may include recess 376 formed in and/or partially through body portion 302 at and/or adjacent to second side 306. Additionally, mounting apparatus 300 of FIG. 23 may also include adjustable clasp 378 including a contact surface 374 that span over the entire width of body portion 302 and/or first side 304. Similarly numbered and/or named components may function in a substantially similar fashion. Redundant explanation of these components has been omitted for clarity.

However, distinct from mounting apparatus 300 shown in FIG. 22, adjustable clasp 378 of mounting apparatus 300 shown in FIG. 23 move circumferentially and/or in a circumferential direction (C) to contact airfoil 42. More specifically, adjustable clasp 378 may in the circumferential direction (C) to move closer to and/or contact airfoil 42. In order to move adjustable clasp 378 in the circumferential direction (C), threaded screw 380 may be positioned at and/or adjacent first side 304 of body portion 302. Additionally, threaded screw 380 may also be oriented and/or extend circumferentially from body portion 302 and/or toward adjustable clasp 378. In the non-limiting example shown in FIG. 22, and as a result of adjustable clasp 378 moving in the circumferential direction (C) to contact airfoil 42, adjustable clasp 378 may only contact suction side 46 of airfoil 42 when releasably coupling mounting apparatus 300 to airfoil 42. As a result of only contacting suction side 46, contact surface 374 of adjustable clasp 378 may include a geometry and/or shape that may be substantially similar and/or correspond suction side 46 of airfoil 42.

Figure 24:
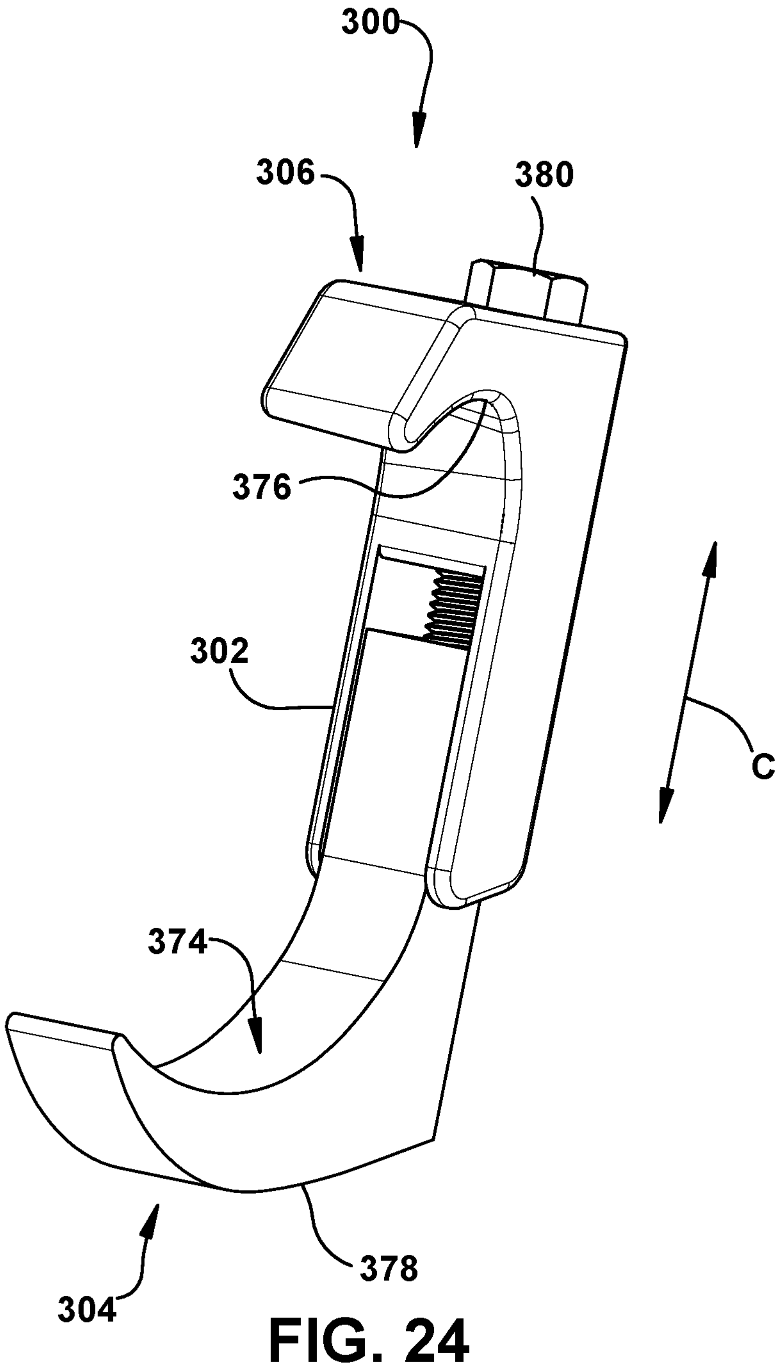
FIG. 24 shows a perspective view of a mounting apparatus including a fixed retention component and an adjustable retention component, according to another embodiment.
Figure 25:
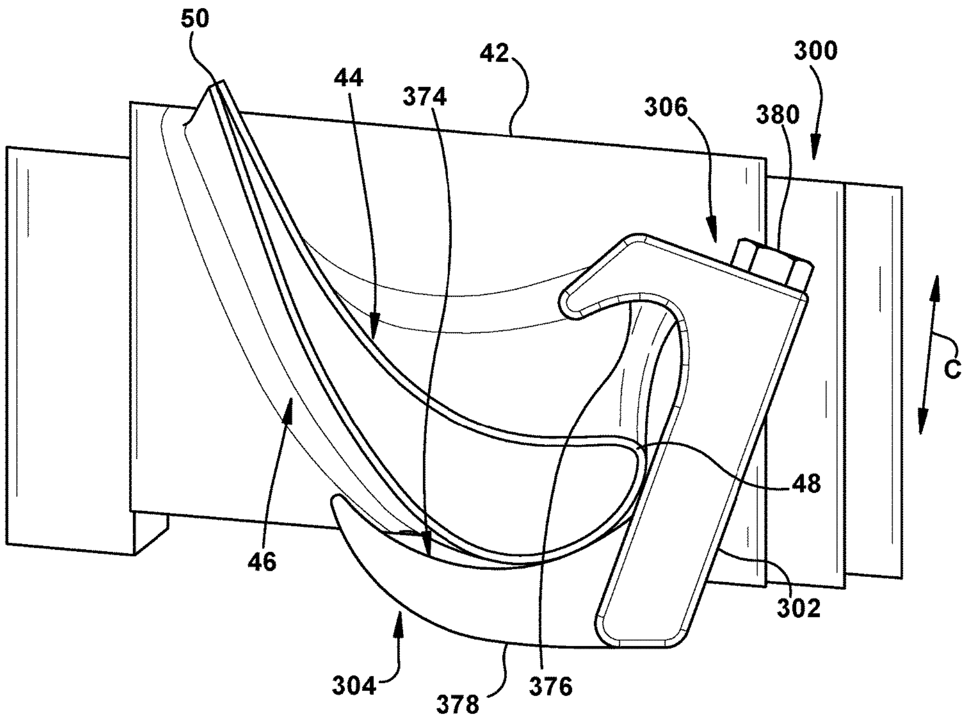
FIG. 25 shows a perspective view of the mounting apparatus of FIG. 24 releasably coupled to a turbine blade, according to embodiments.

FIGS. 24 and 25 show another non-limiting example of mounting apparatus 300. Distinct from previously discussed mounting apparatus 300, mounting apparatus 300 shown in FIGS. 24 and 25 may only be positioned on and/or adjacent one edge (e.g., leading edge 48) of airfoil 42, and/or may not expand axially across airfoil 42. In the non-limiting example, adjustable, first retention component 308 may include adjustable clasp 378 positioned on first side 304 of body portion 302. As shown in FIGS. 24 and 25, and similar to adjustable clasp 378 of mounting apparatus shown and discussed herein with respect to FIG. 23, adjustable clasp 378 may be configured to move in a circumferential direction (C), via threaded screw 380, to contact suction side 46 of airfoil 42. Also as discussed herein, contact surface 374 of adjustable clasp 378 may include a geometry and/or shape that may be substantially similar and/or correspond suction side 46 of airfoil 42 to aid in releasably coupling mounting apparatus 300 to airfoil 42.

Additionally, second retention component 320 of mounting apparatus 300 shown in FIGS. 24 and 25, may include recess 376 formed on second side 306, opposite first side 304. Specifically, recess 376 may be formed in and/or partially through body portion 302 at and/or adjacent to second side 306. In a non-limiting example, recess 376 may include a geometry and/or shape that may be substantially similar and/or correspond to the portion of airfoil 42 that recess 376 may contact and/or receive to releasably couple mounting apparatus 300 to airfoil 42. Specifically, and as shown in FIG. 25, recess 376 may include a geometry and/or shape that may be substantially similar and/or correspond to leading edge 48, a portion of pressure side 44 and/or a portion of suction side 46 of airfoil 42. As such, leading edge 48, a portion of pressure side 44 and/or a portion of suction side 46 of airfoil 42 may be substantially received and/or positioned within recess 376 when mounting apparatus 300 is releasably coupled to airfoil 42 (see, FIG. 25). The corresponding geometry of recess 376 may aid in the releasably coupling of mounting apparatus 300 to airfoil 42, as discussed herein.

Figure 26:
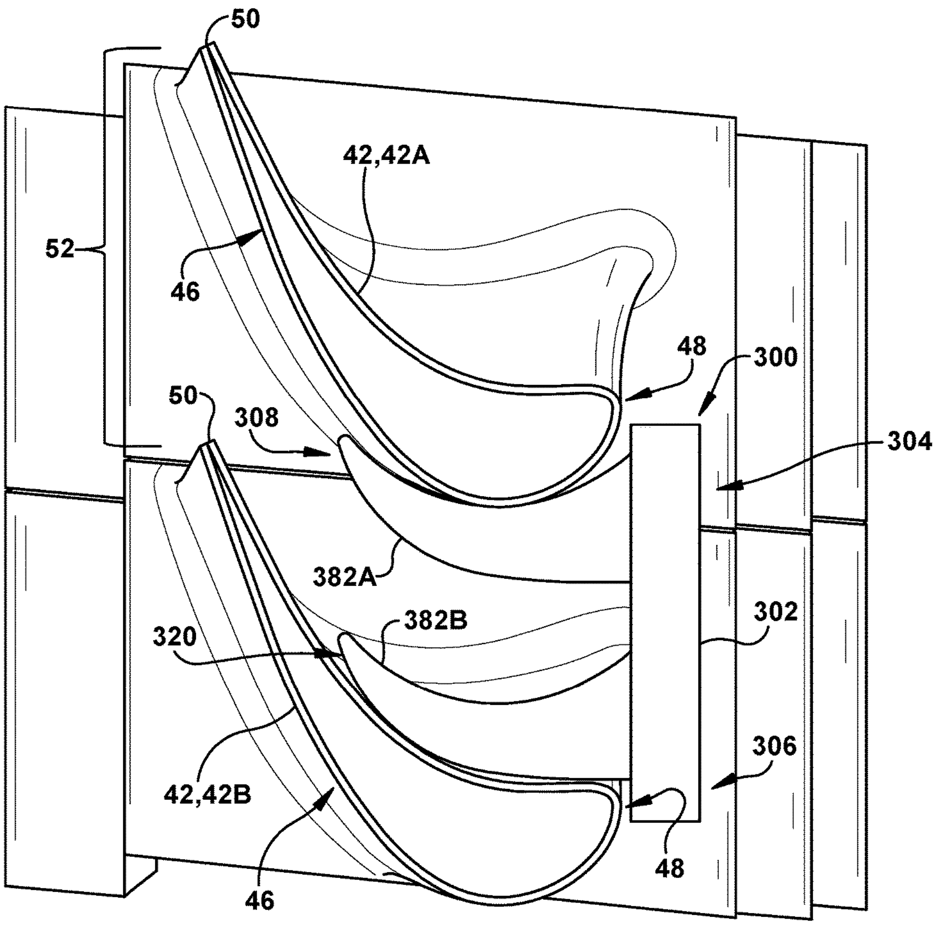
FIG. 26 shows a perspective view of a mounting apparatus including adjustable retention components releasably coupled to two distinct turbine blades, according to further embodiments.

FIG. 26 shows a perspective view of an additional, non-limiting example of mounting apparatus 300 releasably coupled to first airfoil 42A and second airfoil 42B, respectively. In the non-limiting example shown in FIG. 26, adjustable, first retention component 308 and second retention component 320 may each include a contoured member 382 that may extend axially into space 52 and substantially contact a respective airfoil 42 of turbine 28 (see, FIG. 2). More specifically, adjustable, first retention component 308 may include a first contoured member 382A that may be formed adjacent first side 304 of body portion 302, and may extend axially into space 52 adjacent first airfoil 42A. First contoured member 382A of mounting apparatus 300 may be configured to contact and apply a circumferential force on suction side 46 of first airfoil 42A to aid in releasably coupling mounting apparatus 300 to airfoils 42, as discussed herein. In a non-limiting example shown in FIG. 26, contact surface 374 of first contoured member 382A may include a geometry and/or shape that may be substantially similar and/or correspond suction side 46 of first airfoil 42A. In another non-limiting example, first contoured member 382A may include a portion, feature and/or component that may be formed from a substantially compliant or pliable material. The pliable material of first contoured member 382A may be flexed, deformed and/or compressed when contacting suction side 46 of first airfoil 42A and may deform to include a geometry and/or shape that may be substantially similar and/or correspond suction side 46 of first airfoil 42A.

Second retention component 320 may also include a second contoured member 382B that may extend axially into space 52 and substantially contact a respective airfoil 42 of turbine 28 (see, FIG. 2). More specifically, second retention component 320 may include second contoured member 382B that may be formed adjacent second side 306 of body portion 302, and may extend axially into space 52 adjacent second airfoil 42B. Second contoured member 382B of mounting apparatus 300 may be configured to contact and apply a circumferential force on pressure side 44 of second airfoil 42B to aid in releasably coupling mounting apparatus 300 to airfoils 42, as discussed herein. In a non-limiting example shown in FIG. 26, contact surface 374 of second contoured member 382B may include a geometry and/or shape that may be substantially similar and/or correspond pressure side 44 of second airfoil 42B. In another non-limiting example, second contoured member 382B may include a portion, feature and/or component that may be formed from a substantially compliant or pliable material. The pliable material of second contoured member 382B may be flexed, deformed and/or compressed when contacting pressure side 44 of second airfoil 42B and may deform to include a geometry and/or shape that may be substantially similar and/or correspond pressure side 44 of second airfoil 42B.

Figure 27:
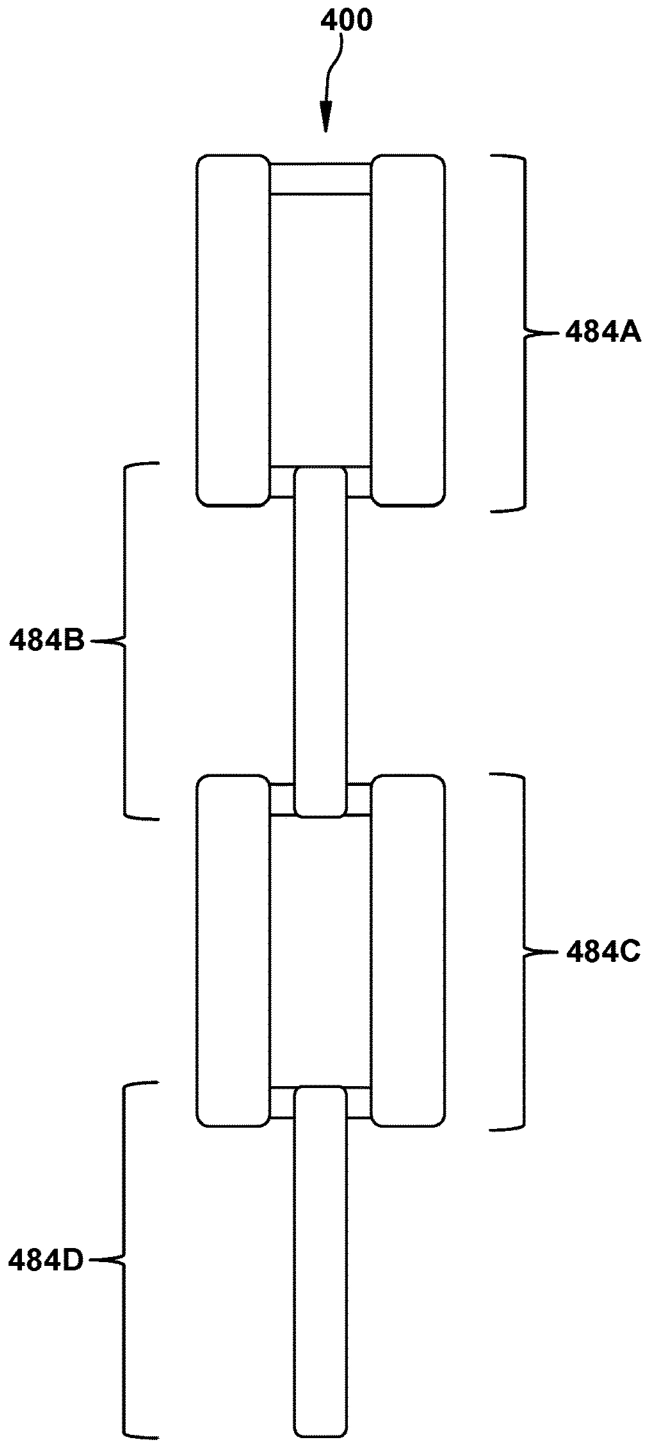
FIG. 27 shows a top view of a multi-joint mounting apparatus, according to embodiments.
Figure 28:
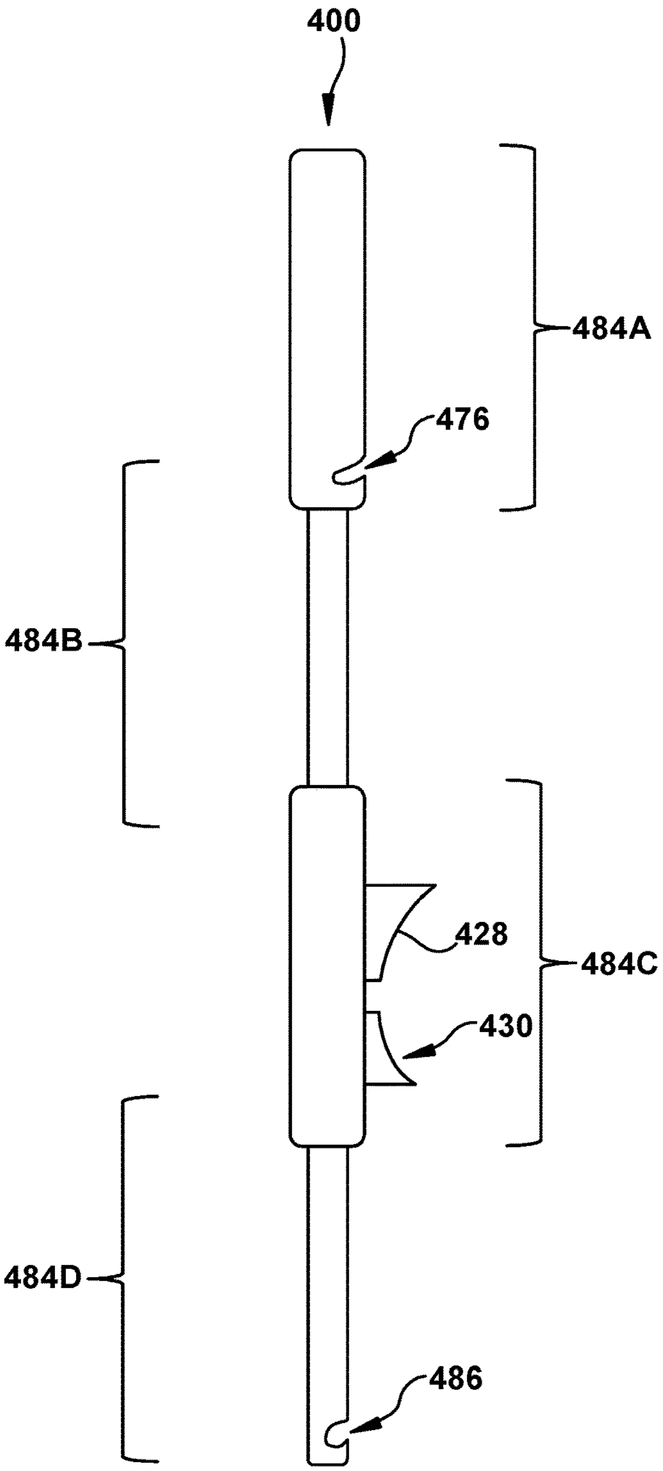
FIG. 28 shows a side view of the multi-joint mounting apparatus of FIG. 27, according to embodiments.
Figure 29:
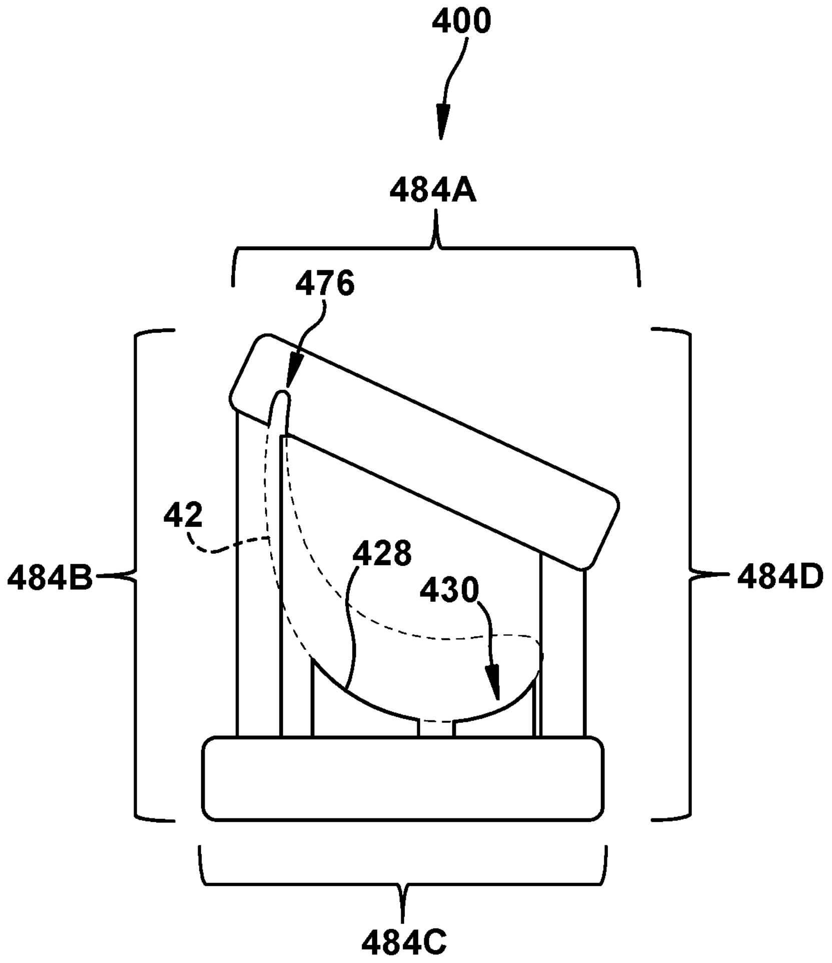
FIG. 29 shows a perspective view of the multi-joint mounting apparatus of FIG. 27 releasably coupled to a turbine blade, according to embodiments.

FIGS. 27-29 show various views of a distinct, non-limiting example of mounting apparatus 400 including distinction, interconnected segments 484 that may substantially wrap around airfoil 42. Specifically, FIG. 27 shows a top view of mounting apparatus 400 including interconnected segments 484, FIG. 28 shows a side view of mounting apparatus 400 including interconnected segments 484, and FIG. 29 shows a side view of mounting apparatus 400 including interconnected segments 484 wrapped around and/or releasably coupled to airfoil 42.

As shown in FIGS. 27-29, mounting apparatus 400 may include four distinct, interconnected segments 484. Specifically, mounting apparatus 400 may include a first segment 484A, a second segment 484B coupled to first segment 484A, a third segment 484C coupled to second segment 484B and a fourth segment 484D coupled to third segment 484C. In a non-limiting example, each segment 484 of mounting apparatus 400 may be configured to be pivotally coupled to and/or may be configured to rotate about adjoining segment(s) 484. For example, first segment 484A may be pivotally coupled and/or configured to rotate about second segment 484B. Second segment 484B may be pivotally coupled and/or configured to rotate about first segment 484A and/or third segment 484C. Additionally, third segment 484C may be pivotally coupled and/or configured to rotate about second segment 484B and/or fourth segment 484D. Fourth segment 484D may be pivotally coupled and/or configured to rotate about third segment 484C. The pivotal coupling and/or rotational relationship between segments 484 of mounting apparatus 400 may aid in mounting apparatus 400 being wrapped around and/or releasably coupled to airfoil 42, as discussed herein.

Turning to FIG. 28, at least a portion of segments 484 may include features and/or components that may aid in releasably coupling mounting apparatus 400 to airfoil 42. In a non-limiting example, first segment 484A may include recess 476. Recess 476 may be substantially similar to recess 376 formed in mounting apparatus 300 (see, FIGS. 19 and 20). That is, recess 476 may be formed in and/or partially through first segment 484A, adjacent second segment 484B. In a non-limiting example, recess 476 may include a geometry and/or shape that may be substantially similar and/or correspond to the portion of airfoil 42 that recess 476 may contact and/or receive to releasably couple mounting apparatus 400 to airfoil 42. Specifically, and as shown in FIGS. 28 and 29, recess 476 may include a geometry and/or shape that may be substantially similar and/or correspond to trailing edge 50, a portion of pressure side 44 and/or a portion of suction side 46 of airfoil 42. As such, trailing edge 50, a portion of pressure side 44 and/or a portion of suction side 46 of airfoil 42 may be substantially received and/or positioned within recess 476 when mounting apparatus 400 is releasably coupled to airfoil 42 (see, FIG. 29). The corresponding geometry of recess 476 may aid in the releasably coupling of mounting apparatus 400 to airfoil 42, as discussed herein.

Additionally, third segment 484C may include at least one insert 428. Insert(s) 428 may be substantially similar to insert 128 positioned within first inflatable pouch 110 of mounting apparatus 100 (see, FIGS. 7-9). Insert 428 may include a predetermined and/or preformed geometry. The geometry may be substantially similar to and/or may correspond to the shape and/or profile of suction side 46 of airfoil 42, which second segment 484B may be positioned adjacent and/or insert 428 may contact when releasably coupling mounting apparatus 400 to airfoil 42 (see, FIG. 29). Insert 428 formed on third segment 484C may contact suction side 46 of airfoil 42 and/or may substantially receive the portion of suction side 46 of airfoil 42 to aid in releasably coupling mounting apparatus 400 to airfoils 42, as discussed herein.

In a non-limiting example, where insert(s) 428 includes preformed a geometry 430, insert 428 may be formed from a substantially rigid material including, but not limited to, metal, metal-alloys, ceramic, polymer material (e.g., rubber, plastic), foam, wood and the like. In another non-limiting example, insert 428 may not include preformed geometry 430 prior to contacting suction side 46 of airfoil 42. In this non-limiting example, insert 428 may be formed from a substantially elastic, deformable and/or pliable material, such that when insert 428 contacts suction side 46 of airfoil 42, insert 428 may substantially contour to a portion of suction side 46 of airfoil 42 to form geometry 430.

Furthermore, fourth segment 484D of mounting apparatus 400 may include a hook 486. Hook 486 may be positioned at an end of fourth segment 484D, opposite third segment 484C. Hook 486 may be configured to releasably couple fourth segment 484D to a portion of first segment 484A. That is, and as shown in FIG. 29, when mounting apparatus 400 is wrapped around and/or releasably coupled to airfoil 46, hook 486 may be attached to first segment 484A and/or may releasably couple fourth segment 484D to first segment 484A. Releasably coupling fourth segment 484D to first segment 484A may aid in releasably coupling mounting apparatus 400 to airfoil 42, as discussed herein. Although shown as utilizing hook 486, it is understood that fourth segment 484D may be releasably coupled to first segment 484A using any suitable releasable coupling mechanism and/or technique. For example, fourth segment 484D of mounting apparatus 400 may be releasably coupled to first segment 484A using magnets, fasteners, ties and the like.

The terminology used herein is for the purpose of describing particular embodiments only, and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A mounting apparatus, comprising:

a body portion configured to be at least partially positioned between a first airfoil and a second airfoil of a turbine system;

an adjustable, first retention component formed on a first side of the body portion, the adjustable, first retention component configured to contact a portion of a suction side of the first airfoil of the turbine system; and a second retention component formed on a second side of the body portion, opposite the first side, the second retention component configured to contact a portion of a pressure side of the second airfoil of the turbine system.

2. The mounting apparatus of claim 1, wherein the adjustable, first retention component includes a first inflatable pouch positioned on the first side of the body portion, the first inflatable pouch configured to:

contact and substantially contour to the portion of the suction side of the first airfoil in an inflated state of the first inflatable pouch; and contact and be oriented substantially planar with the first side of the body portion in a deflated state of the first inflatable pouch.

3. The mounting apparatus of claim 2, further comprising:

at least one gripping pad positioned on the first inflatable pouch, the at least one gripping pad directly contacting the suction side of the first airfoil in the inflated state of the first inflatable pouch.

4. The mounting apparatus of claim 3, wherein the at least one pad includes a geometry substantially similar to the portion of the pressure side of the second airfoil of the turbine system.

5. The mounting apparatus of claim 2, further comprising:

an insert positioned within the first inflatable pouch, the insert including a geometry substantially similar to the portion of the suction side of the first airfoil of the turbine system.

6. The mounting apparatus of claim 2, wherein the second retention component includes a curved portion formed integral with the second side of the body portion, the curved portion configured to contact the portion of the pressure side of the second airfoil of the turbine system in the inflated state and the deflated state of the first inflatable pouch.

7. The mounting apparatus of claim 6, wherein the curved portion includes a geometry substantially similar to the portion of the pressure side of the second airfoil of the turbine system.

8. The mounting apparatus of claim 2, wherein the second retention component includes a flexible component positioned on the second side of the body portion, the flexible component configured to contact and substantially contour to the portion of the pressure side of the second airfoil of the turbine system in the inflated state and the deflated state of the first inflatable pouch.

9. The mounting apparatus of claim 2, wherein the second retention component includes a second inflatable pouch positioned on the second side of the body portion, the second inflatable pouch configured to:

contact and substantially contour to the portion of the pressure side of the second airfoil in an inflated state of the second inflatable pouch; and contact and be oriented substantially planar with the second side of the body portion in a deflated state of the second inflatable pouch.

10. The mounting apparatus of claim 1, wherein the body portion includes:

a first linkage including a hinge, the hinge of the first linkage configured to move toward the suction side of the first airfoil of the turbine system in an expanded state of the first linkage; and a second linkage positioned opposite the first hinged linkage, the second linkage including a hinge, wherein the hinge of the second linkage is configured to move toward the pressure side of the second airfoil of the turbine system in an expanded state of the second linkage.

11. The mounting apparatus of claim 10, wherein the adjustable, first retention component includes a first pin positioned adjacent to and extending from the hinge of the first linkage, the first pin configured to pivot at least partially about the hinge of the first linkage.

12. The mounting apparatus of claim 11, wherein the first pin is releasably coupled to the hinge of the first linkage and is configured to contact the pressure side of the first airfoil in the expanded state of the first linkage.

13. The mounting apparatus of claim 11, wherein the second retention component includes a second pin positioned adjacent to and extending from the hinge of the second linkage, the second pin configured to pivot at least partially about the hinge of the second linkage.

14. The mounting apparatus of claim 13, wherein the second pin is releasably coupled to the hinge of the second linkage and is configured to contact the pressure side of the second airfoil in the expanded state of the second linkage.

15. The mounting apparatus of claim 10, wherein the adjustable, first retention component includes a first pliable component coupled to and extending from the hinge of the first linkage, the first pliable component configured to contact and substantially contour to the portion of the suction side of the first airfoil of the turbine system in the expanded state of the first linkage.

16. The mounting apparatus of claim 15, wherein the second retention component includes a second pliable component coupled to and extending from the hinge of the second linkage, the second pliable component configured to contact and substantially contour to the portion of the pressure side of the second airfoil of the turbine system in the expanded state of the second linkage.

17. A turbine system comprising:

a first airfoil including a pressure side and a suction side;

a second airfoil positioned adjacent the first airfoil, the second airfoil including a pressure side and a suction side; and a mounting apparatus releasably coupled to the first airfoil and the second airfoil, the mounting apparatus including:

a body portion configured to be at least partially positioned between the first airfoil and the second airfoil;

an adjustable, first retention component formed on a first side of the body portion, the adjustable, first retention component configured to contact a portion of the suction side of the first airfoil; and a second retention component formed on a second side of the body portion, opposite the first side, the second retention component configured to contact a portion of the pressure side of the second airfoil.

18. The turbine system of claim 17, wherein the adjustable, first retention component of the mounting apparatus includes a first inflatable pouch positioned on the first side of the body portion, the first inflatable pouch configured to:

contact and substantially contour to the portion of the suction side of the first airfoil in an inflated state of the first inflatable pouch; and contact and be oriented substantially planar with the first side of the body portion in a deflated state of the first inflatable pouch.

19. The turbine system of claim 18, wherein the second retention component of the mounting apparatus includes a curved portion formed integral with the second side of the body portion, the curved portion configured to contact the portion of the pressure side of the second airfoil in the inflated state and the deflated state of the first inflatable pouch.

20. The turbine system of claim 17, wherein:

the adjustable, first retention component of the mounting apparatus includes a first pin extending from the body portion; and the second retention component of the mounting apparatus includes a second pin positioned extending from the body portion, opposite the first pin.

* * * * *